(12) United States Patent
Kitazato

(10) Patent No.: US 10,171,546 B2
(45) Date of Patent: Jan. 1, 2019

(54) CONTENT REPRODUCTION APPARATUS, CONTROL INFORMATION PROVIDING SERVER, AND CONTENT REPRODUCTION SYSTEM

(75) Inventor: Naohisa Kitazato, Tokyo (JP)

(73) Assignee: Saturn Licensing LLC, New York, NY (US)

( * ) Notice: Subject to any disclaimer, the term of this patent is extended or adjusted under 35 U.S.C. 154(b) by 1088 days.

(21) Appl. No.: 13/642,923

(22) PCT Filed: Apr. 21, 2011

(86) PCT No.: PCT/JP2011/059842
§ 371 (c)(1),
(2), (4) Date: Nov. 27, 2012

(87) PCT Pub. No.: WO2011/136124
PCT Pub. Date: Nov. 3, 2011

(65) Prior Publication Data
US 2013/0204919 A1    Aug. 8, 2013

(30) Foreign Application Priority Data
Apr. 30, 2010   (JP) ................................. 2010-105467

(51) Int. Cl.
*H04L 29/08*       (2006.01)
*H04N 21/432*     (2011.01)
(Continued)

(52) U.S. Cl.
CPC ......... *H04L 67/02* (2013.01); *H04N 21/4325* (2013.01); *H04N 21/858* (2013.01); *H04N 21/8541* (2013.01)

(58) Field of Classification Search
CPC .............. G06Q 30/00; G06Q 30/0601; G06Q 30/0643; G06F 17/30873; G06F 3/04815;
(Continued)

(56) References Cited

U.S. PATENT DOCUMENTS 5,966,121 A   10/1999  Hubbell et al.
6,564,056 B1 *  5/2003  Fitzgerald ........... H04L 12/2803
                                                                340/5.1
(Continued)

FOREIGN PATENT DOCUMENTS

CN    101111895 A    1/2008
CN    101312523 A   11/2008
(Continued)

OTHER PUBLICATIONS

Yoshikatsu Kishida et al., "An Application Based on the Video Hypermedia Technology Virtual Travel 'TakeMe' ", IPSJ SIG Notes, May 17, 1996 (May 17, 1996), vol. 96, No. 40., pp. 55 to 60, ISSN:0919-6072.
(Continued)

*Primary Examiner* — Arvin Eskandarnia
(74) *Attorney, Agent, or Firm* — Lerner, David, Littenberg, Krumholz & Mentlik, LLP

(57) ABSTRACT

Provided is a content reproduction apparatus including a reproduction control unit that controls reproduction of a link-type content including a plurality of scenarios that each include content data and control information regarding reproduction of the content data, and a control information acquisition unit that acquires the control information. The reproduction control unit controls the reproduction of the link-type content by reproducing the content data in accordance with the control information including event information used to transition from a current scenario to another scenario.

11 Claims, 43 Drawing Sheets

(51) Int. Cl.
*H04N 21/8541* (2011.01)
*H04N 21/858* (2011.01)

(58) Field of Classification Search
CPC .......... H04N 21/4347; H04N 21/4722; H04N 21/4725; H04N 21/8541; H04L 64/02
See application file for complete search history.

(56) References Cited

U.S. PATENT DOCUMENTS

| | | | | |
|---|---|---|---|---|
| 7,467,356 | B2* | 12/2008 | Gettman | G06F 3/04815 707/E17.111 |
| 7,685,023 | B1* | 3/2010 | Abraham et al. | 705/27.2 |
| 7,870,489 | B2 | 1/2011 | Serita et al. | |
| 8,359,392 | B2* | 1/2013 | Garbajs | H04L 63/0428 380/229 |
| 8,572,660 | B2* | 10/2013 | Riley | H04N 7/20 725/63 |
| 2003/0158914 | A1 | 8/2003 | Satomi et al. | |
| 2004/0151323 | A1* | 8/2004 | Olkin | G06Q 20/401 380/280 |
| 2006/0031899 | A1* | 2/2006 | Rabin | G06Q 20/12 725/104 |
| 2006/0034583 | A1 | 2/2006 | Shimizu | |
| 2007/0061855 | A1 | 3/2007 | Serita et al. | |
| 2008/0033845 | A1* | 2/2008 | McBride | G06Q 10/087 705/28 |
| 2008/0148345 | A1* | 6/2008 | Rubio | G06F 21/31 726/1 |
| 2009/0089866 | A1 | 4/2009 | Yato et al. | |
| 2009/0132805 | A1* | 5/2009 | Ginter | G06F 21/10 713/150 |
| 2009/0138376 | A1* | 5/2009 | Smyers et al. | 705/27 |
| 2009/0234789 | A1 | 9/2009 | Odaka et al. | |
| 2010/0086133 | A1* | 4/2010 | Asano | H04L 9/0822 380/255 |
| 2010/0088735 | A1* | 4/2010 | Sadja | H04N 21/4307 725/109 |
| 2010/0146446 | A1* | 6/2010 | Ahn et al. | 715/821 |
| 2010/0162306 | A1* | 6/2010 | Craner | G06T 15/60 725/39 |
| 2011/0099384 | A1* | 4/2011 | Grange | H04L 9/0897 713/184 |
| 2011/0208619 | A1* | 8/2011 | Siounis et al. | 705/27.2 |
| 2013/0036059 | A1* | 2/2013 | Oura | G06F 21/6218 705/71 |

FOREIGN PATENT DOCUMENTS

| | | |
|---|---|---|
| CN | 101409710 | 4/2009 |
| JP | 2003-242117 A | 8/2003 |
| JP | 2007-079800 A | 3/2007 |
| JP | 2008053916 | 3/2008 |
| JP | 2008-113247 A | 5/2008 |
| RU | 2295760 C2 | 3/2007 |
| WO | 2005-006748 A1 | 1/2005 |
| WO | 2008115666 A1 | 9/2008 |

OTHER PUBLICATIONS

Shunsuke Kodama et al., "Agent o Mochiita Taiwagata TV Bangumi no Tameno Scenario Kijutsu Gengo", IPSJ Symposium Series (Symposium on Mutlimedia, Distributed, Cooperative and Mobile Systems (DICOMO'99) Ronbunshu), Jun. 30, 1999 (Jun. 30, 1996), vol. 99, No. 7, pp. 429 to 434, ISSN: 1344-0640.

Korean Office Action for Application No. 10-2012-7024882 dated Feb. 28, 2017.

\* cited by examiner

FIG. 5
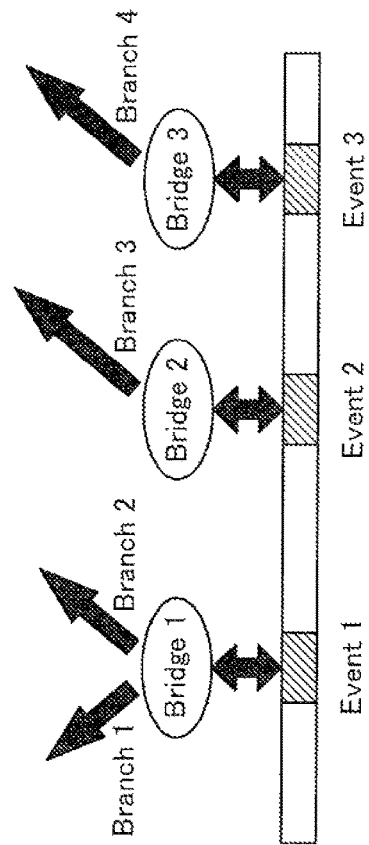
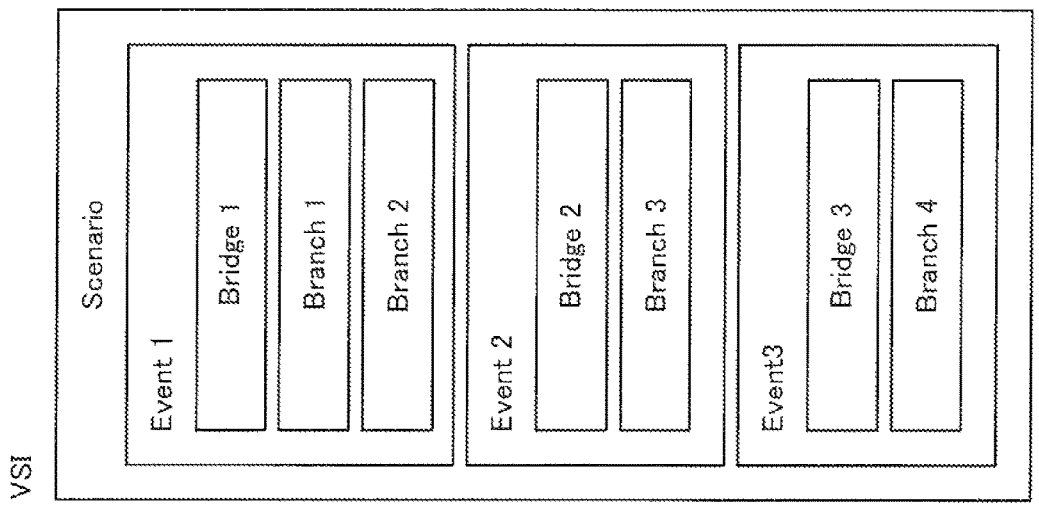

FIG. 24
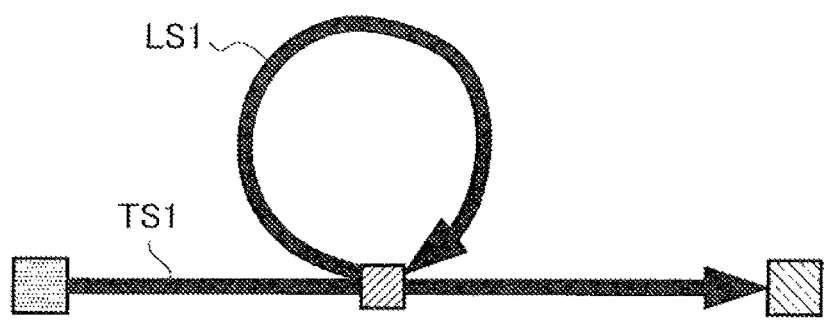
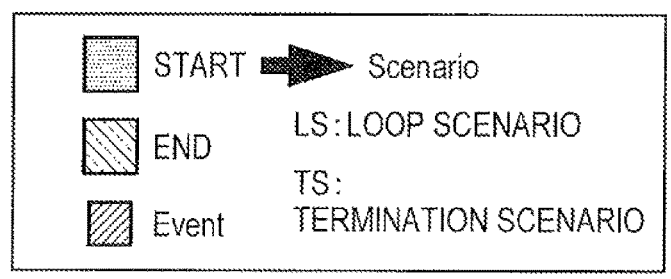

FIG. 30

| ELEMENT (ATTRIBUTE) | | NUMBER OF OCCURRENCES | VALUE | DEFINITION AND DETAILED OPERATION | BASIC PROFILE LIMITATION |
|---|---|---|---|---|---|
| Scenario | | 1 | | SCENARIO ELEMENTS (ALL) | |
| @profile | | 1 | | PROFILE NUMBER | 1,1 |
| @id | | 1 | INTEGER | SCENARIO ID | |
| @provider | | 0..1 | | PROVIDER LABEL | |
| @media | | 0..1 | "movie", "still", "slide_show", "app" | MEDIA TYPE OF SCENARIO | "app" IS LIMITED OPERATION |
| @link | | 1 | "loop", "connected", "terminated" | LINK TYPE OF SCENARIO | |
| entry | | 1..2 | | | |
| | @type | 1 | "cad", | TYPE OF ENTRY FILE | |
| | @stereoscopic | 0..1 | "2D","3D" | 2D/3D IDENTIFICATION OF SCENARIO STREAM | |
| | @location | 1 | | ENTRY STREAM URL | |
| event | | 0..N | | DIVISION EVENT INFORMATION | |
| commontoken | | 0..1 | | | MAXIMUM |
| providertoken | | 0..1 | | USER AUTHENTICATION, CONTEXT INFORMATION FORMAT IS DEPENDENT ON PROVIDER | NO OPERATION |

FIG. 31

| ELEMENT (ATTRIBUTE) | NUMBER OF OCCURRENCES | VALUE | DEFINITION AND DETAILED OPERATION | BASIC PROFILE LIMITATION |
|---|---|---|---|---|
| event | 0..N | | DIVISION EVENT | MAXIMUM NUMBER |
| @streamend | 0..1 | | WHEN STREAM ENDS (CAN BE PLACED ONLY IN CASE OF connected branch) | |
| @autoevent | 0..1 | 1 fix | DIVIDED WITHOUT USER'S OPERATION IN CASE OF 1 WHEN EVENT CONDITION IS SATISFIED | NO OPERATION |
| timeframe | 0..1 | 1 fix | TIME RANGE OF DIVISION EVENT | |
| @startNRT | 0..1 | | EVENT START TIME LOCATION (TIME FROM CONTENT BEGINNING) | |
| @endNRT | 0..1 | | EVENT END TIME LOCATION (TIME FROM CONTENT BEGINNING) | |
| spaceframe | 0..1 | | SPACE RANGE OF DIVISION EVENT | NO OPERATION |
| @upperleft_horizontal | 1 | | UPPER LEFT HORIZONTAL COORDINATES OF SPACE RANGE | |
| @upperleft_vertical | 1 | | UPPER LEFT VERTICAL COORDINATES OF SPACE RANGE | |
| @lowerright_horizontal | 1 | | LOWER RIGHT HORIZONTAL COORDINATES OF SPACE RANGE | |
| @lowerright_vertical | 1 | | LOWER RIGHT VERTICAL COORDINATES OF SPACE RANGE | |
| bridge | 1 | | BRIDGE | |
| branch | 1..N | | BRANCH | |

FIG. 32

| ELEMENT (ATTRIBUTE) | NUMBER OF OCCURRENCES | VALUE | DEFINITION AND DETAILED OPERATION | BASIC PROFILE LIMITATION |
|---|---|---|---|---|
| bridge | | | BRIDGE | |
| @immediate | 0..1 | 1 | Branch scenario ACTIVATION WITHOUT USER SELECTION | CASE OF ONLY 0 |
| @layouttype | 1 | 0~N | LAYOUT PATTERN OF BRIDGE SCREEN | NO OPERATION |
| bridgepicture | 0..N | | STILL IMAGE INFORMATION FOR BRIDGE | |
| @id | 0..1 | 1~N | STILL IMAGE NUMBER IN SCREEN | |
| @type | 1 | | MEDIA TYPE | |
| @url | 1 | | STILL IMAGE URL | |
| bridgeaudio | 0..1 | | AUDIO INFORMATION FOR BRIDGE | NO OPERATION |
| @url | 1 | | AUDIO FILE URL | |
| bridgetitle | 1 | | DESCRIPTION OF BRIDGE SCREEN TITLE | |
| @size | 0..1 | | FONT SIZE | NO OPERATION |
| @font | 0..1 | | FONT TYPE | NO OPERATION |
| @color | 0..1 | | FONT COLOR | NO OPERATION |
| bridgedescription | 0..N | | DESCRIPTION OF BRIDGE SCREEN TEXT | |
| @id | 1 | | Description NUMBER | CASE OF ONLY 1 |
| @size | 0..1 | | FONT SIZE | NO OPERATION |
| @font | 0..1 | | FONT TYPE | NO OPERATION |
| @color | 0..1 | | FONT COLOR | NO OPERATION |

FIG. 33

| ELEMENT (ATTRIBUTE) | NUMBER OF OCCURRENCES | VALUE | DEFINITION AND DETAILED OPERATION | BASIC PROFILE LIMITATION |
|---|---|---|---|---|
| branch | 1 | | | |
| @scenarioid | 1 | | DIVISION DESTINATION SCENARIO ID | |
| @profile | 0..1 | | REGARDED AS 1 WHEN DIVISION DESTINATION SCENARIO PROFILE IS NOT DESIGNATED | |
| @provider | 1 | | DIVISION DESTINATION PROFILE LABEL | |
| @media | 0..1 | | DIVISION DESTINATION SCENARIO MEDIA TYPE | "app" IS NOT OPERATED |
| @link | 1 | | DIVISION DESTINATION SCENARIO LINK TYPE | |
| entry | 1 | | ENTRY INFORMATION OF BRANCH | |
| @type | 1 | | ENTRY FILE TYPE | |
| @location | 1 | | DIVISION DESTINATION ENTRY FILE URL | |
| @starttime | 0..1 | | START TIME LOCATION OF DIVISION DESTINATION SCENARIO | |

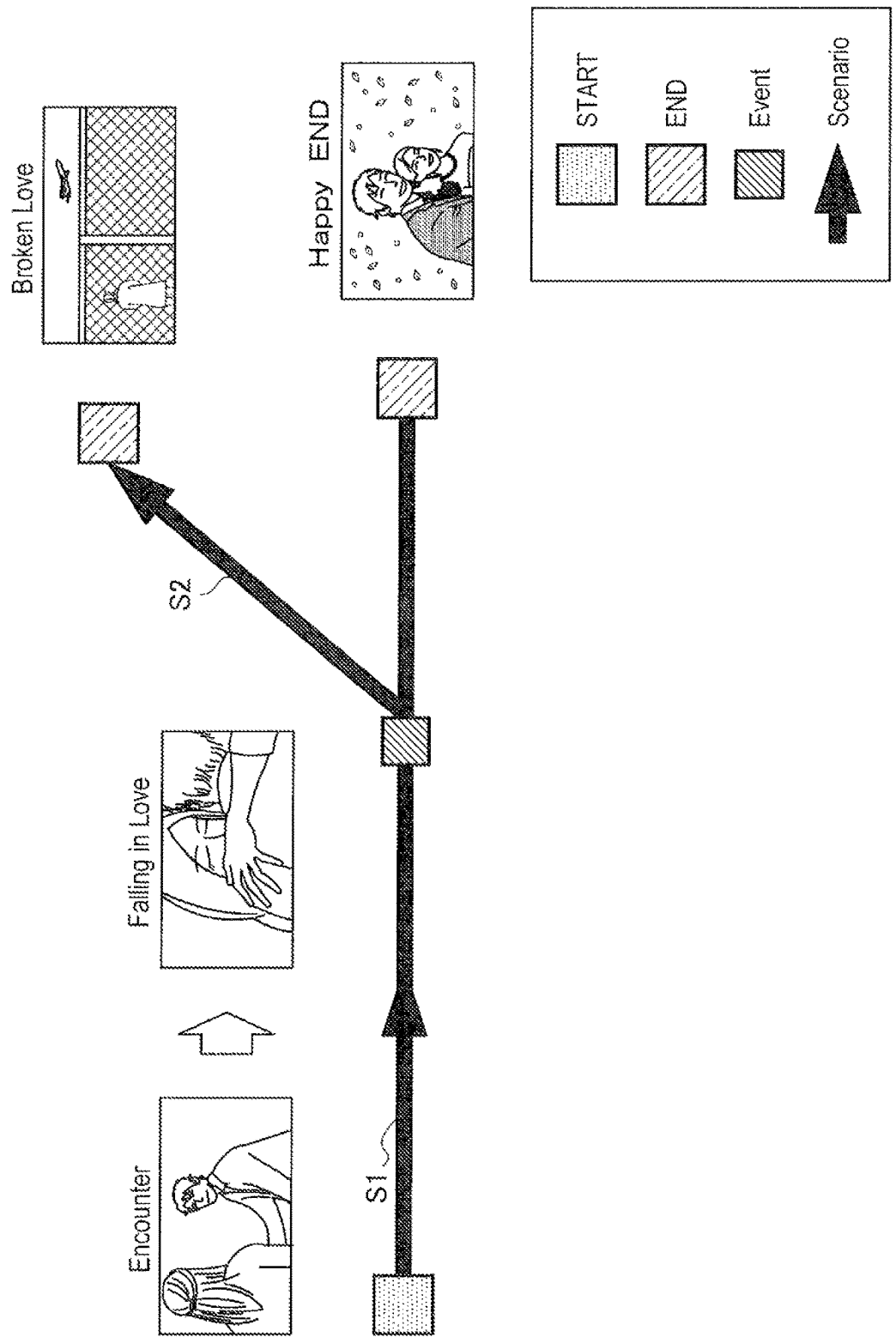

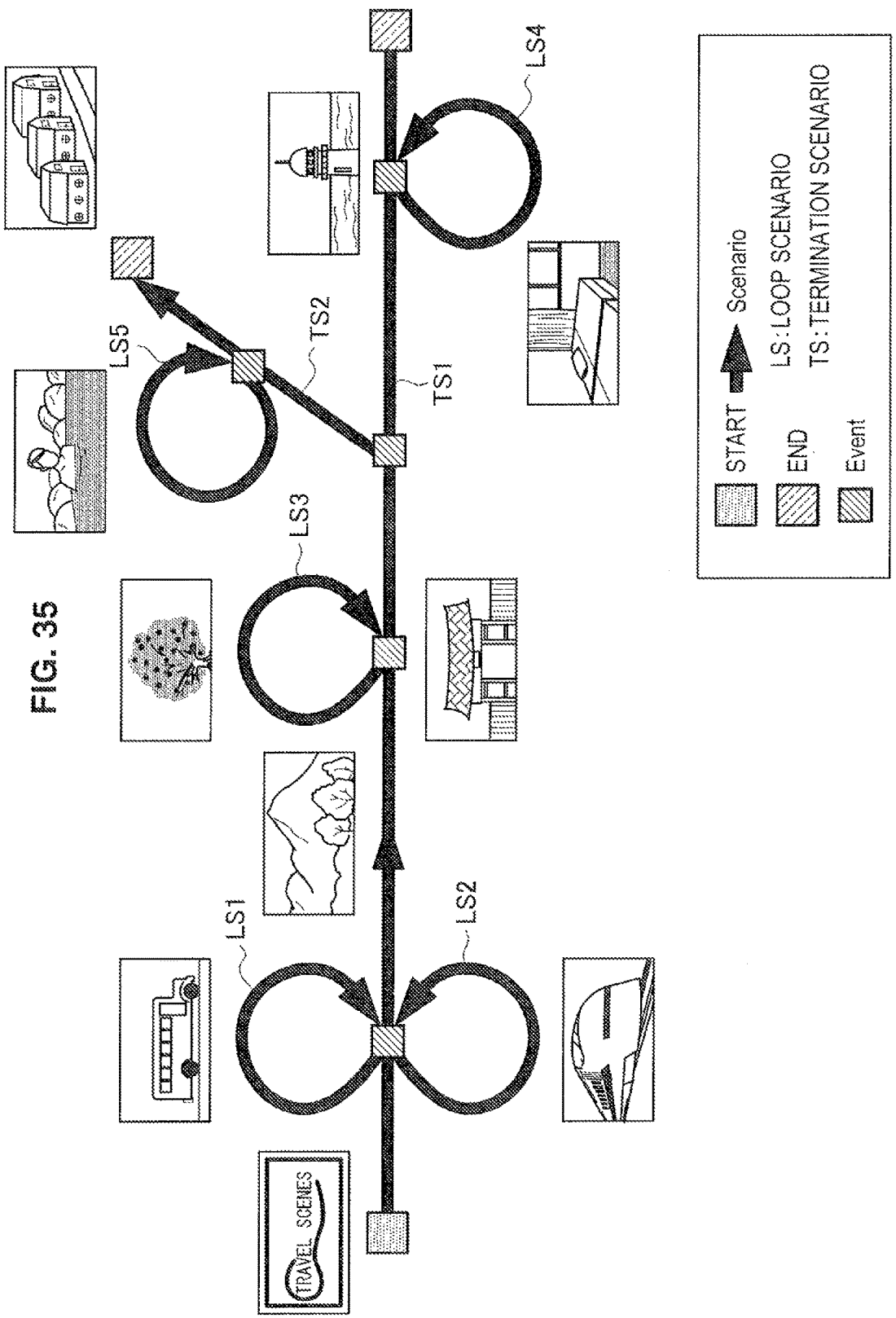

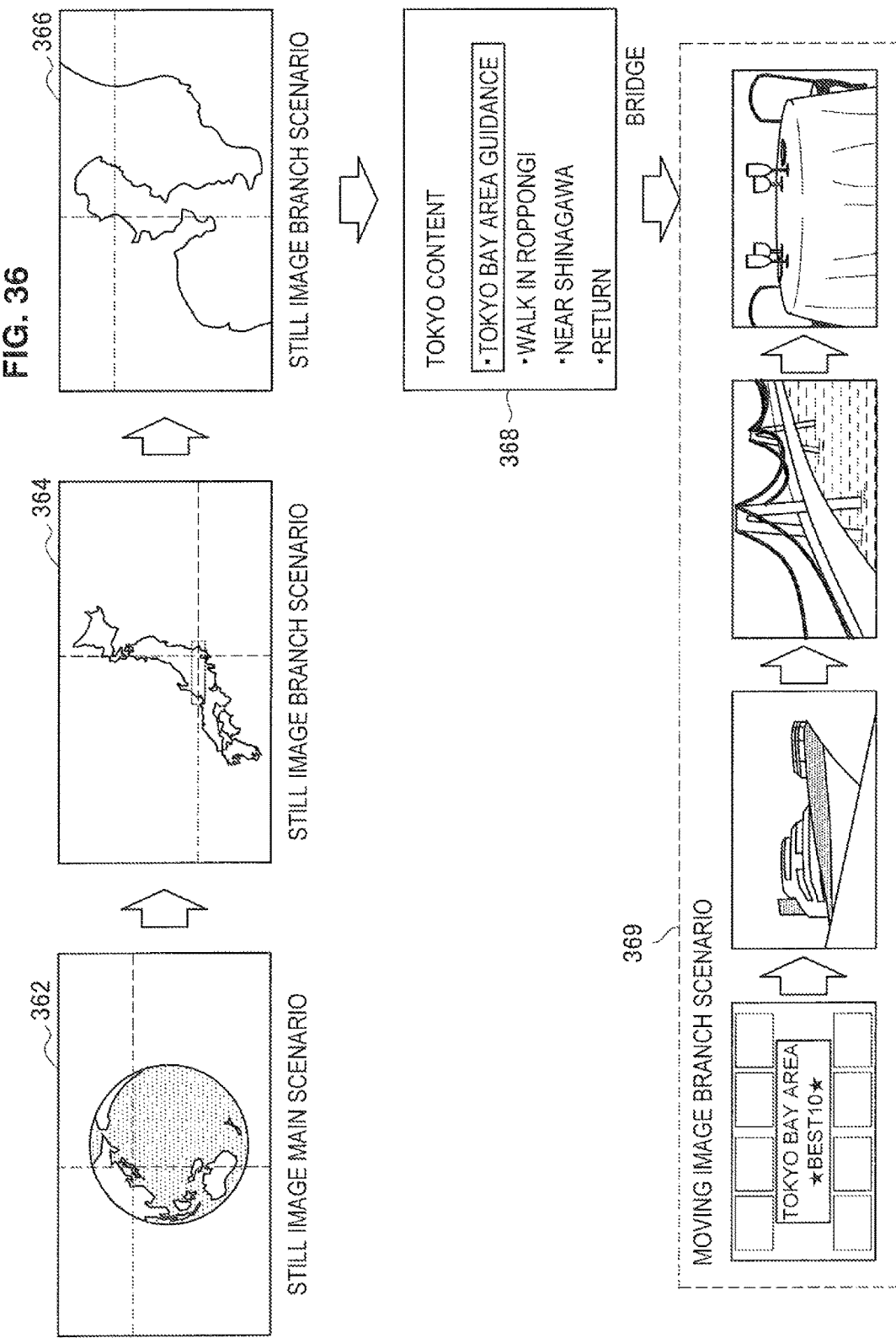

FIG. 37
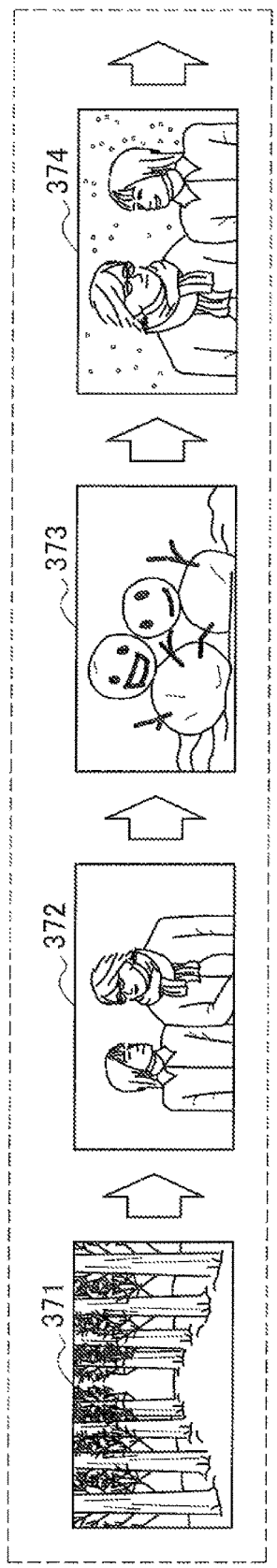
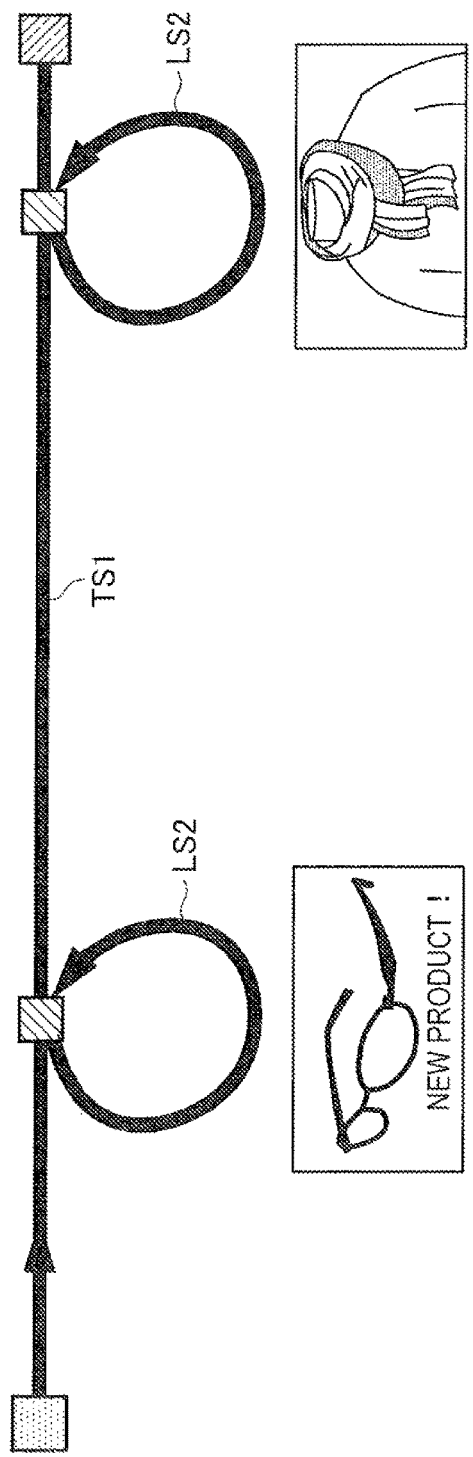

FIG. 40
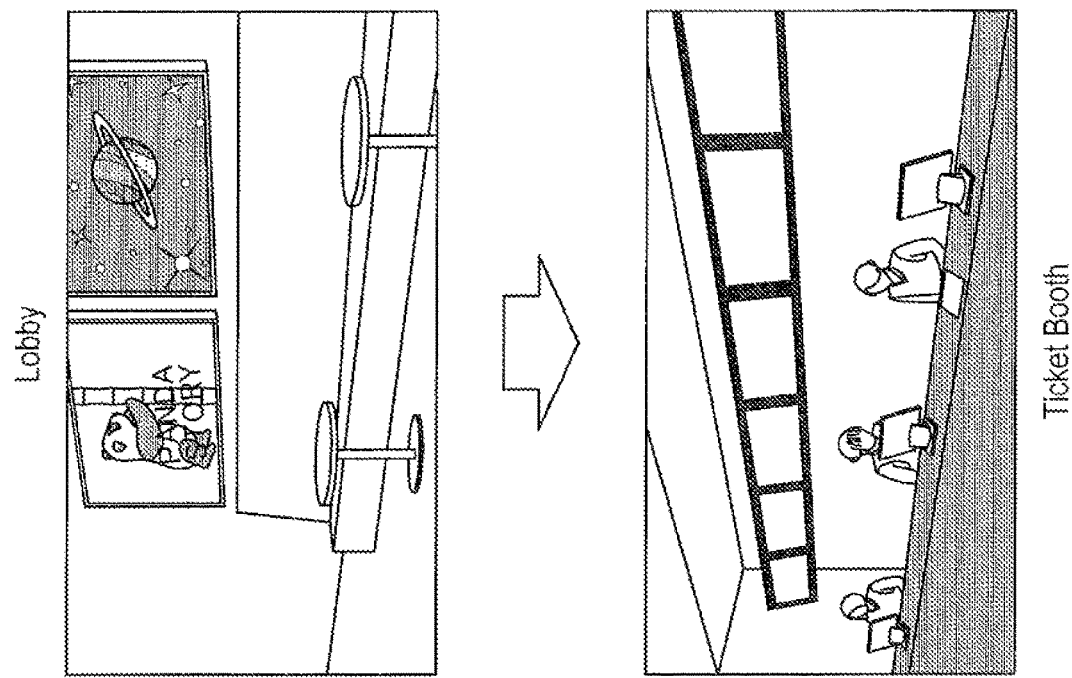
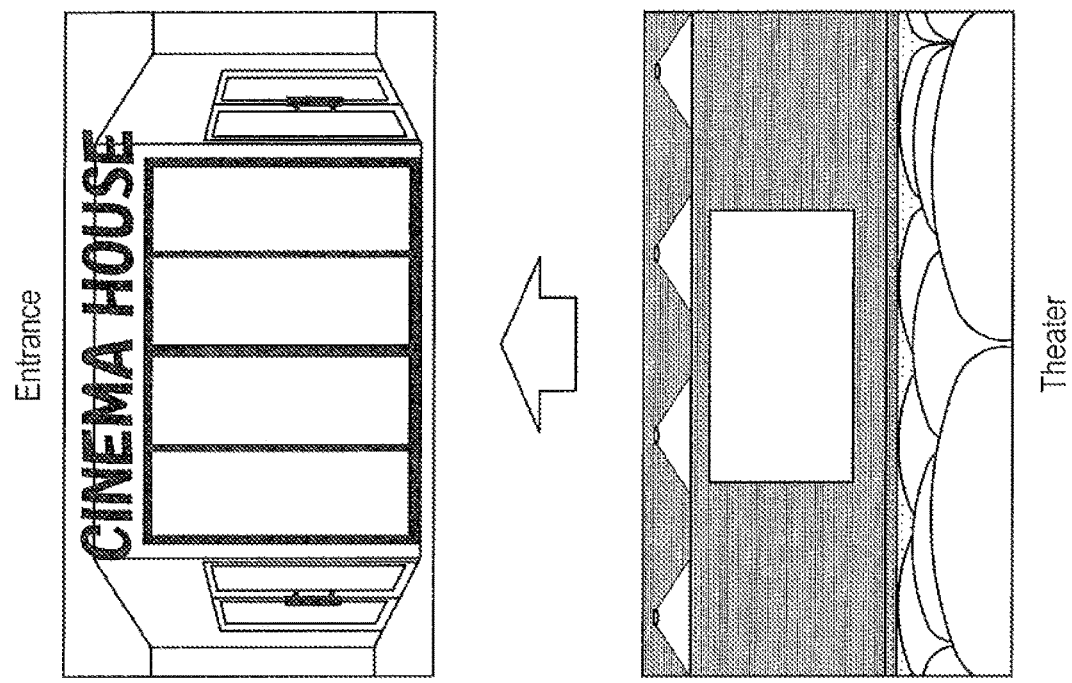

CONTENT REPRODUCTION APPARATUS, CONTROL INFORMATION PROVIDING SERVER, AND CONTENT REPRODUCTION SYSTEM

CROSS-REFERENCE TO RELATED APPLICATION

The present application is a national phase entry under 35 U.S.C. § 371 of International Application No. PCT/JP2011/059842 filed Apr. 21, 2011, published on Nov. 3, 2011, as WO 2011/136124 A1, which claims priority from Japanese Patent Application No. JP 2010-105467 filed in the Japanese Patent Office on Apr. 30, 2010.

TECHNICAL FIELD

The present invention relates to a content reproduction apparatus, a control information providing server, and a content reproduction system.

BACKGROUND ART

At present, with the development of communication infrastructure, various services are provided via communication networks such as the Internet. For example, media contents such as music or moving images are provided via the Internet in a download or streaming manner.

In such a content providing service, for example, a list of contents to be provided is usually displayed on a web page. According to most of the related art, when a user performs an operation of selecting a desired content from the list of the contents, the selected content starts to be reproduced. A content is usually configured according to a stream of a single time axis that has one starting point and one ending point.

On the other hand, for example, in a game world, a multimedia engine is mounted on a terminal apparatus and a plurality of streams including a plurality of time axes are linked and reproduced by executing a program language. When this reproduction of the streams is applied to contents other than the game, link-type contents using various expressions can be provided.

However, when a complex multimedia engine is mounted, cost may increase. Therefore, high functional expressions provided by a multimedia engine are not necessary in contents for which complex processing of the game is not necessary to perform. Accordingly, JP 2008-113247A discloses a content reproduction system that reproduces another content on a reproduction division screen of a moving image file in response to a user's operation in accordance with a moving image file and a separate guide file or performing a process of ending reproduction.

CITATION LIST

Patent Literature

Patent Literature 1: JP 2008-113247A

SUMMARY OF INVENTION

Technical Problem

However, the content reproduction system disclosed in JP 2008-113247A simply defines a user's operation or the like of transitioning one content to another content. For example, when the content reproduction system is applied to a content in which a plurality of streams are linked complicatedly or one content is operated by a plurality of providers, there is a problem that the content reproduction system is not suitable.

The present invention is devised in view of the above-mentioned problem and an object of the present invention is to provide a novel and improved content reproduction apparatus, a novel and improved control information providing server, and a novel and improved content reproduction system capable of reproducing a link-type content which includes a plurality of scenarios formed by content data and control information used to control reproduction of the content data and to which a scenario is linked.

Solution to Problem

According to an aspect of the present invention in order to achieve the above-mentioned object, there is provided a content reproduction apparatus including a reproduction control unit that controls reproduction of a link-type content including a plurality of scenarios that each include content data and control information regarding reproduction of the content data, and a control information acquisition unit that acquires the control information. The reproduction control unit controls the reproduction of the link-type content by reproducing the content data in accordance with the control information including event information used to transition from a current scenario to another scenario.

Further, the event information of the control information may include information used to acquire control information of a scenario of a transition destination, the control information acquisition unit may acquire the control information of the scenario of the transition destination based on the information used to acquire the control information of the scenario of the transition destination, and the reproduction control unit may control the transition of the scenario by reproducing content data of the scenario of the transition destination in accordance with the control information of the scenario of the transition destination.

Further, the control information acquisition unit may take over authentication information of a user between the scenarios by adding the authentication information of the user to an acquisition request message used to acquire the control information, transmitting the acquisition request message, and acquiring the control information to which the authentication information of the user is added.

Further, the control information acquisition unit may add common user authentication information commonly used in the scenarios of the link-type content and user authentication information of each provider given to each provider that provides the scenario to the acquisition request message used to acquire the control information.

Further, when the control information acquisition unit determines that the current scenario and another scenario are provided by a same provider, the control information acquisition unit may add the user authentication information of each provider based on the control information to the acquisition request message used to acquire the control information of the another scenario.

Further, the event information may include bridge information that defines a user interface when the current scenario transitions to another scenario, and the reproduction control unit may display a bridge screen configured to transition to the another scenario based on the bridge information.

Further, it may further include a reproduction processing unit that performs a production process under control of the reproduction control unit. The bridge information may include information of a still image to be displayed during a setup period of the another scenario, and the reproduction processing unit may include a still image reproduction unit that reproduces the still image, a moving image reproduction unit that reproduces a moving image, and a selector that switches between an output image of the still image reproduction unit and an output image of the moving image reproduction unit.

Further, the control information may include media-type information of the content data, and the reproduction control unit may perform control such that the reproduction processing unit performs a process of reproducing the content data in accordance with the media-type information.

Further, when a media-type of the content data is a moving image, the control information may include information regarding at least one of two-dimensional video content data and three-dimensional video content data.

Further, the event information may include information indicating a range in which the current scenario transitions to another scenario, and the reproduction control unit may display the bridge screen when a user performs an operation of activating the event within the range.

Further, when the scenario of the transition destination is a loop scenario that returns to a transition point of a scenario of a transition source, the reproduction control unit may retain information regarding the transition point and the control information of the scenario of the transition source and reproduces the scenario of the transition destination.

Further, when the loop scenario further transitions to still another scenario and the still another scenario is not a loop scenario, the reproduction control unit may cancel the retention of the information regarding the transition point and the control information of the scenario of the transition source.

According to another aspect of the present invention in order to achieve the above-mentioned object, there is provided a control information providing server including a communication unit that receives an acquisition request for acquiring control information regarding reproduction of content data from a content reproduction apparatus reproducing the content data, and an input/output control unit that provides the content production apparatus with the control information including event information used to transition from a current scenario to another scenario based on the acquisition request.

Further, according to another aspect of the present invention in order to achieve the above-mentioned object, there is provided a content reproduction apparatus including a content reproduction apparatus that reproduces content data, a content providing server that provides the content data, and a control information providing server that provides control information regarding the reproduction of the content data, the control information being associated with the content data. The content reproduction apparatus may include a reproduction control unit that controls reproduction of a link-type content including a plurality of scenarios that each include content data and control information regarding reproduction of the content data, a control information acquisition unit that acquires the control information associated with the content data to be reproduced from the control information providing server, and a reproduction control unit that controls the reproduction of the content data in accordance with the control information. The reproduction control unit may control the reproduction of the link-type content by controlling transition between the scenarios by reproducing the content data in accordance with the control information.

Advantageous Effects of Invention

According to the present invention described above, it is possible to provide a content reproduction apparatus, a control information providing server, and a content reproduction system capable of reproducing a plurality of linked streams.

BRIEF DESCRIPTION OF DRAWINGS

FIG. 5 is a diagram illustrating the configuration of a VSI.

FIG. 24 is a diagram illustrating an example of a scenario configuration of a content.

FIG. 30 is a table illustrating an example of detailed specifications of the VSI (scenario).

FIG. 31 is a table illustrating an example of detailed specifications of the VSI (Event portion).

FIG. 32 is a table illustrating an example of detailed specifications of the VSI (bridge portion).

FIG. 33 is a table illustrating an example of detailed specifications of the VSI (branch portion).

FIG. 34 is a diagram illustrating an example of a multi-scenario content realizable by applying the content reproduction system according to the embodiment.

FIG. 35 is a diagram illustrating an example of an experience-based tour content realized by applying the content reproduction system according to the embodiment.

FIG. 36 is a diagram illustrating an example of a content realized by applying the content reproduction system according to the embodiment.

FIG. 37 is a diagram illustrating an example in which a moving image content associated with a main moving image content is provided by applying the content reproduction system according to the embodiment.

FIG. 40 is a diagram illustrating an example of a user experience realized by the virtual space shown in FIG. 39.

DESCRIPTION OF EMBODIMENTS

Figure 1:
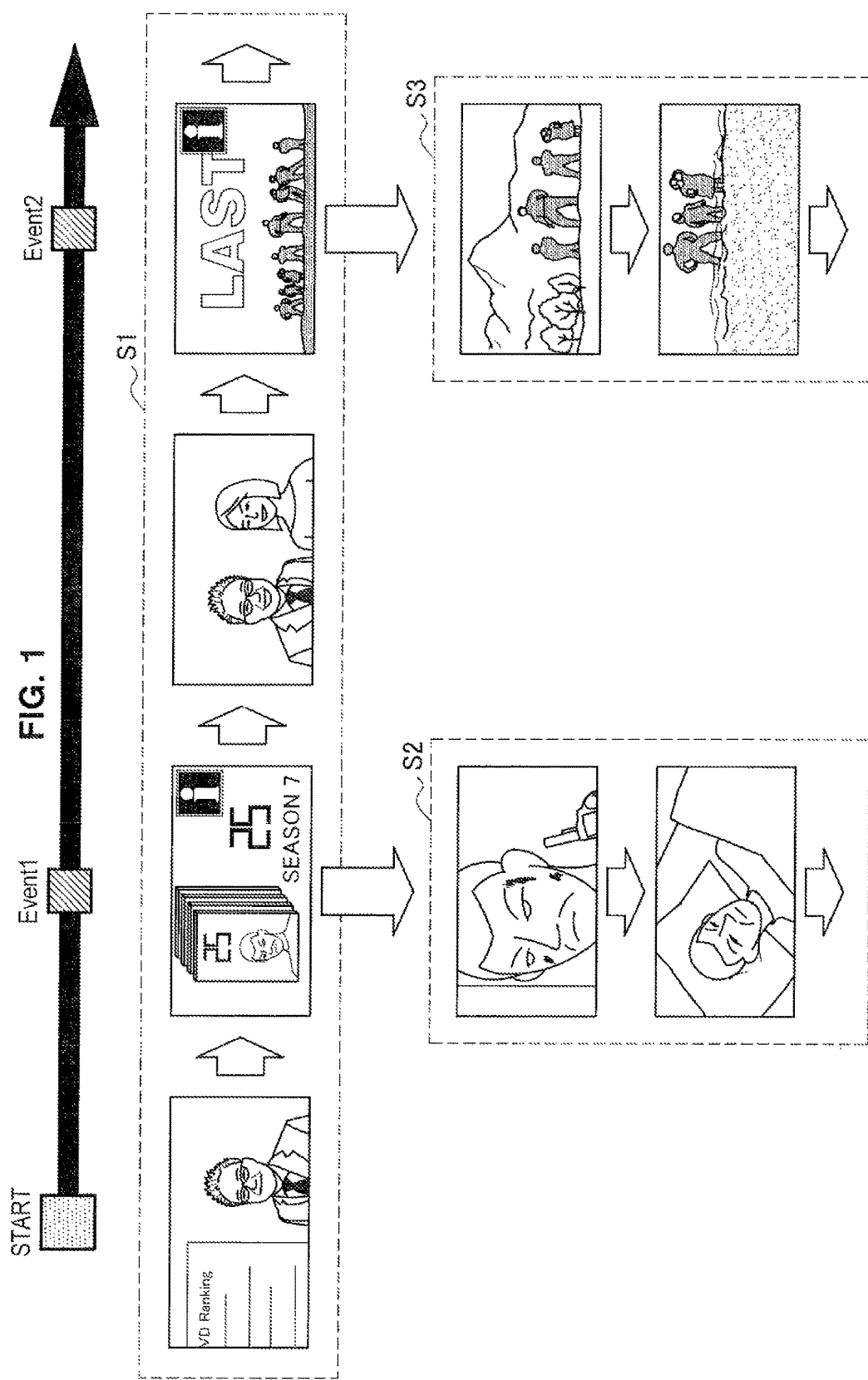
FIG. 1 is a diagram illustrating an overview of a content reproduction system according to an embodiment of the present invention.

Hereinafter, preferred embodiments of the present invention will be described in detail with reference to the appended drawings. Note that, in this specification and the drawings, elements that have substantially the same function and structure are denoted with the same reference signs, and repeated explanation is omitted.

Throughout the specification and the drawings, different letters are sometimes given after the same reference numeral of a plurality of constituent elements having substantially the same functional configuration. For example, a plurality of constituent elements having substantially the same functional configuration are distinguished from each other, as in a VSI server 300*a* and a VSI server 300*b*. However, when it is not necessary to particularly distinguish a plurality of constituent elements having substantially the same functional configuration, the same reference numerals are given. For example, when it is not necessary to particularly distinguish the VSI server 300*a* and the VSI server 300*b* from each other, the VSI server 300*a* and the VSI server 300*b* are simply referred to as the VSI servers 300.

Figure 2:
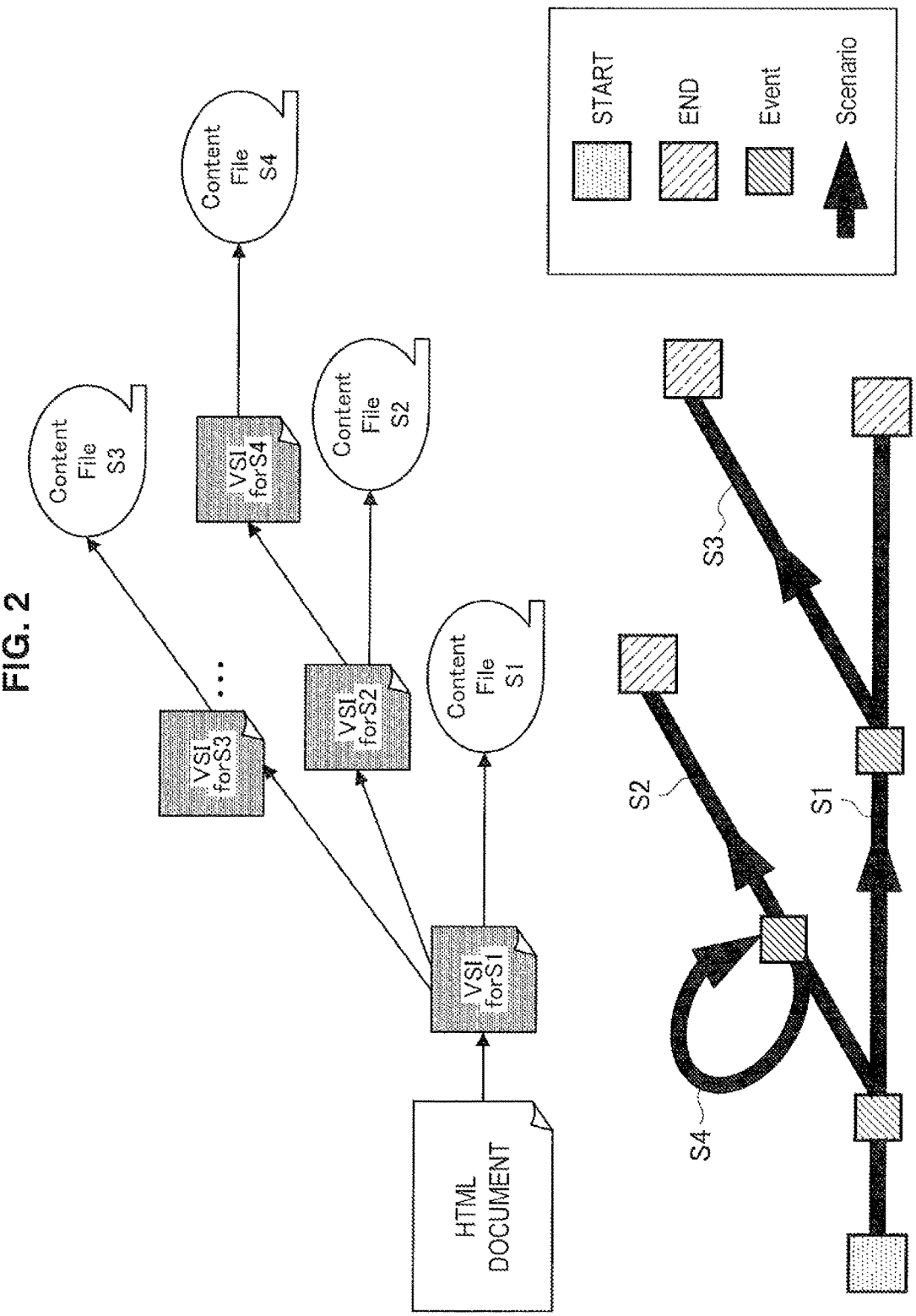
FIG. 2 is a diagram illustrating the data structure of a link-type content produced by of the content reproduction system according to the embodiment of the present invention.
Figure 3:
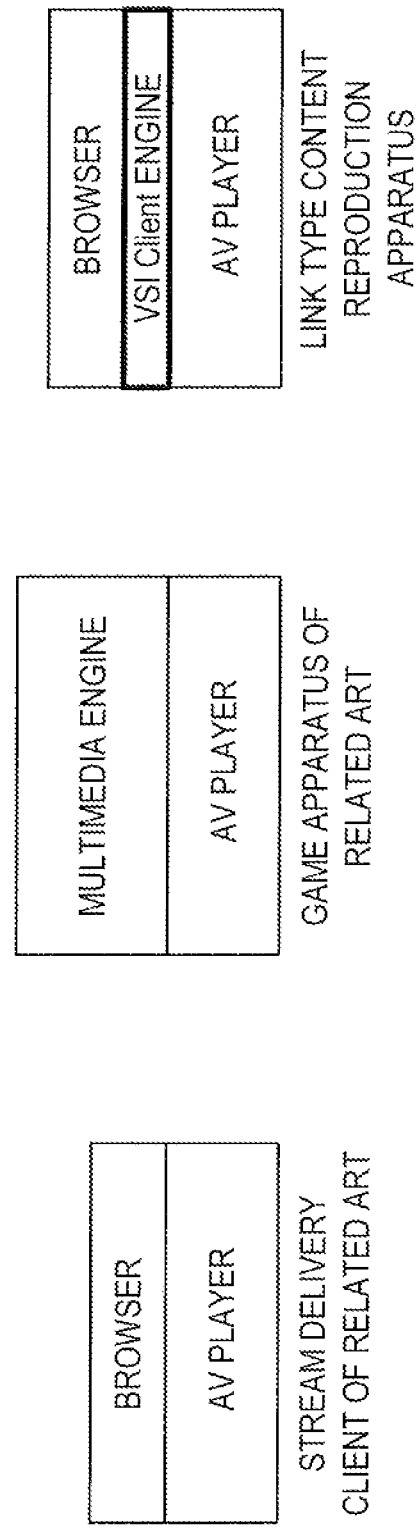
FIG. 3 is a diagram illustrating a difference between the configurations of content reproduction apparatuses.

The description will be made in the following order.
1. Overview
2. Functional Configuration
3. Terminology Definition
4. Kinds of Scenarios
5. Kinds of Events
6. Patterns of Bridges
7. Examples of Operations
8. Takeover of Authentication Token
9. Example of Detailed Specifications of Control Information
10. Examples of Application Services 1. Overview The overview of a content reproduction system according to an embodiment of the present invention will be described with reference to FIGS. 1 to 3, 44, and 45 in comparison to a content reproduction system according to the related art. FIG. 1 is a diagram illustrating the overview of the content reproduction system according to the embodiment. FIG. 2 is a diagram illustrating the data structure of a link-type content reproduced by the content reproduction system according to the embodiment. FIG. 3 is a diagram illustrating a difference between the configurations of the content production apparatus according to the embodiment and the content production apparatus according to the related art.

Figure 44:
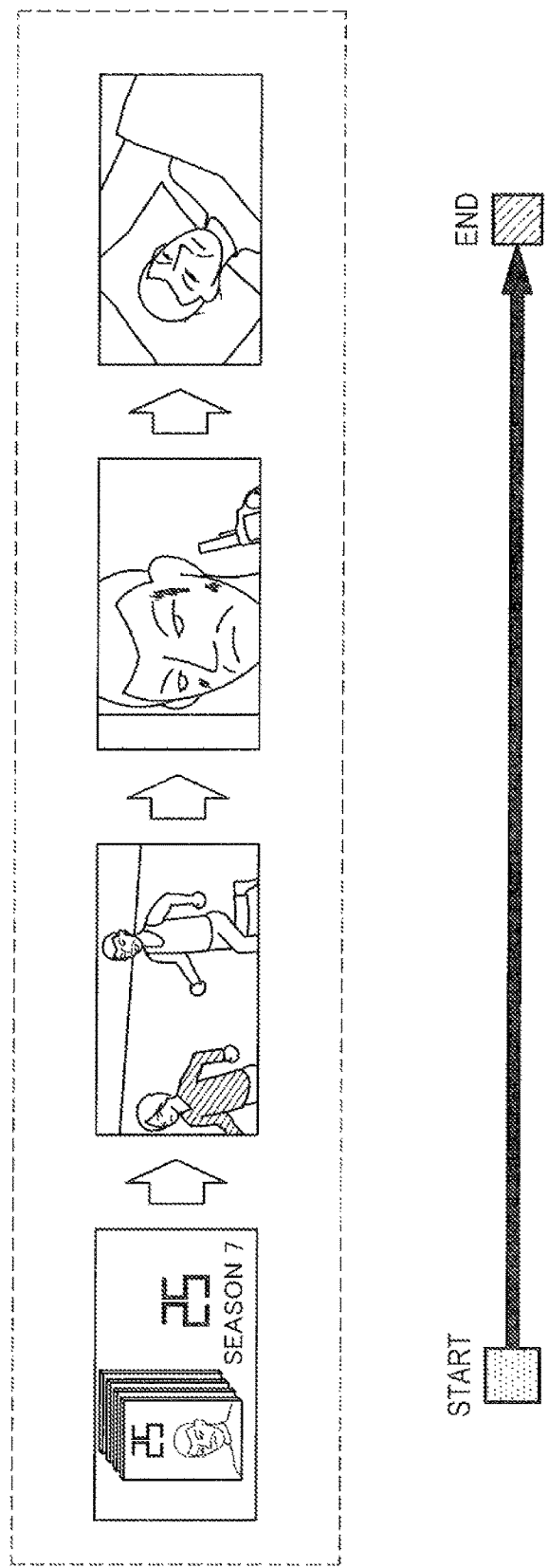
FIG. 44 is a diagram illustrating the overview of reproduction of a content according to the related art.
Figure 45:
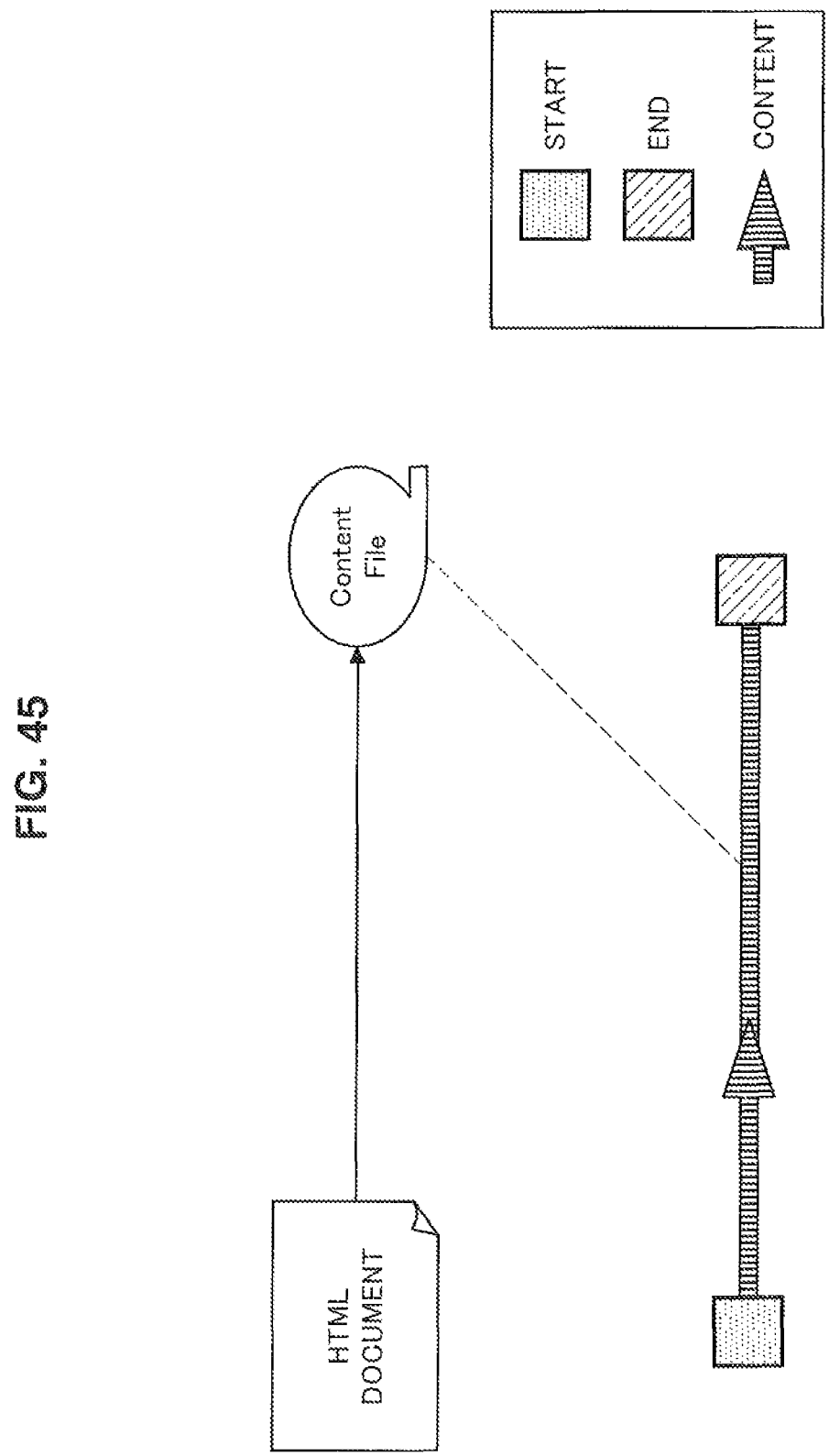
FIG. 45 is a diagram illustrating a data structure in the reproduction of the content according to the related art.

FIG. 44 is a diagram illustrating the overview of a content reproduction system according to the related art. FIG. 45 is a diagram illustrating the data structure of a content reproduced by the content reproduction system according to the related art.

First, referring to FIG. 44, the content reproduction system according to the related art reproduces a content configured according to a stream of a single time axis which has one starting point and one ending point. On the other hand, referring to FIG. 1, a content reproduction system according to the embodiment can reproduce a content configured such that a plurality of streams of a plurality of time axes are linked. Such a content is referred to as a link-type content below. The link-type content includes a plurality of scenarios each configured by a stream of a single time axis. For example, a scenario S1 shown in FIG. 1 is linked to a scenario S2 at Event 1 and is linked to a scenario S3 at Event 2. That is, one link-type content is configured such that a plurality of scenarios are linked. At this time, when the scenario S1 is reproduced, the scenarios S2 and S3 are referred to as branch scenarios from the viewpoint of the scenario S1. On the other hand, the scenario S1 is also referred to as a base scenario.

The scenario S1 is an information program content and is a content that introduces, for example, movie information. At this time, when a branch scenario is assumed to be an introduced movie content and, for example, a user performs an operation of viewing the content at a scene (within Event 1) in which a movie is introduced, the scenario S1 is linked to the scenario S2 and content data of the scenario S2 can be reproduced.

Throughout the specification and the drawings, reference numerals are sometimes given to scenarios to distinguish the scenarios from each other. However, the reference numerals are used to distinguish the scenarios from each other in the same drawing. Even when the same reference numeral is given in another drawing, the same reference numeral may not necessarily indicate the same scenario. In the same drawing, scenarios to which the same reference numeral is given are assumed to be the same scenarios.

Next, referring to FIG. 45, when a user selects a desired content from a list of the contents provided by an HTML document, the content reproduction system according to the related art acquires and reproduces the content data of the selected content.

On the other hand, when a user selects a desired content from a list of the contents provided by an HTML document, as in FIG. 2, a content reproduction apparatus of the content reproduction system according to the embodiment acquires video scenario information (VSI), which is control information of a scenario first reproduced in the selected content. Then, the content reproduction apparatus reproduces the content data in accordance with the VSI. For example, even when the scenario S1 is linked to the scenario S2, the content reproduction apparatus acquires the VSI of the scenario S2 with reference to the position of the VSI of the scenario S2 described in the VSI of the scenario S1, acquires the content data of the scenario S2 in accordance with the VSI of the scenario S2, and then reproduces the content data of the scenario S2.

Thus, one scenario includes one piece of content data and VSI which is control information used to control reproduction of the content data. The details of the VSI will be described later.

Next, referring to FIG. 3, the configuration of the content reproduction apparatus (link-type content reproduction apparatus) according to the embodiment will be described in comparison to a client of the related art receiving a delivered stream and a game apparatus of the related art. An AV player and browser are mounted on a client apparatus of the related art that receives a delivered stream, as described with reference to FIGS. 44 and 45. On the other hand, instead of a browser, a heavy multimedia engine is mounted on a game apparatus of the related art, such that various expressions are realized. However, for example, when a multimedia engine is mounted on an information processing apparatus such as a television receiver, the information processing apparatus is heavy in an operation, and thus a comfortable operation may not be expected. Accordingly, the content reproduction apparatus according to the embodiment can be realized by mounting a light engine (VSI client engine) expanding the functions of an AV player.

The content reproduction apparatus of the content reproduction system according to the embodiment can be realized using all kinds of information processing apparatuses such as personal computers (PC), household video processing apparatuses (DVD recorders or video recorders), personal digital assistants (PDA), and household electrical appliances and portable information processing apparatuses such as portable telephones, personal handyphone systems (PHS), portable reproduction apparatuses, and portable video processing apparatuses. Further, the content reproduction apparatus may be realized by game apparatuses such as household game apparatuses and portable game apparatuses.

2. Functional Configuration
Content Reproduction System 10

Figure 4:
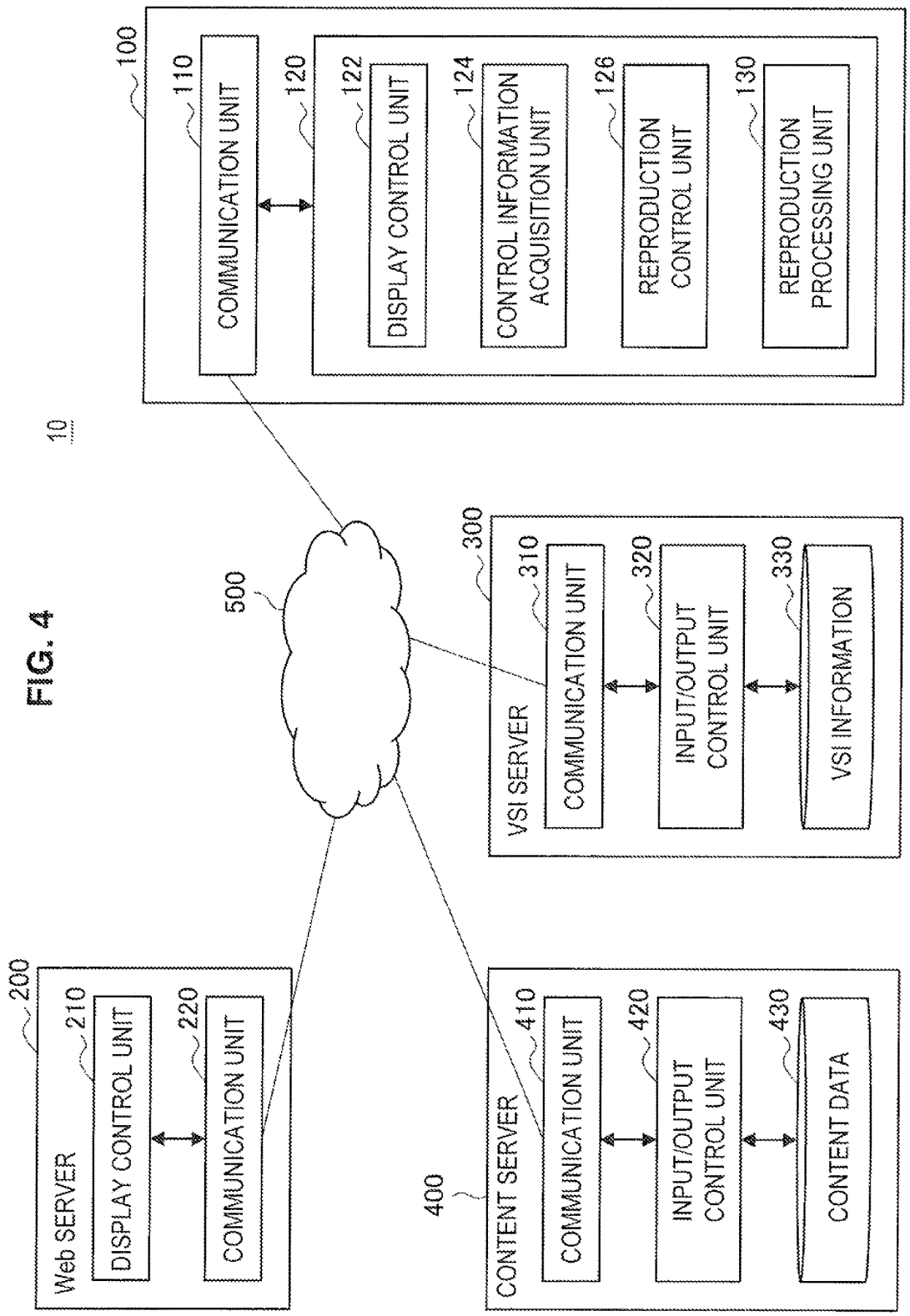
FIG. 4 is a block diagram illustrating the configuration of the content reproduction apparatus.

Next, the functional configuration of the content reproduction system will be described with reference to FIG. 4. FIG. 4 is a block diagram illustrating the functional configuration of the content reproduction system according to the embodiment.

A content reproduction system 10 according to an embodiment of the present invention includes a content reproduction apparatus 100, a web server 200 that provides a content list screen or the like to a user, a VSI server 300 that provides VSI, and a content sever 400 that provides content data. The content reproduction apparatus 100, the web server 200, the VSI server 300, and the content server 400 are connected to each other via a network 500.

Here, the VSI and the content data are assumed to be stored in separate servers, but the present invention is not limited thereto. For example, the VSI and the content data may be stored in one server. Here, the single VSI server 300 and the single content server 400 are provided, but the plurality of VSI servers 300 and the plurality of content servers 400 may be provided. For example, the content reproduction system 10 may include the content server 400 provided by a plurality of providers. Likewise, the VSI server 300 may be also provided by a plurality of providers.

Content Reproduction Apparatus 100

The content reproduction apparatus 100 is an information processing apparatus that has a function of reproducing a link-type content. The content reproduction apparatus 100 acquires the VSI from the VSI server 300 and acquires content data of a content reproduced in accordance with the acquired VSI from the content server 400. The content reproduction apparatus 100 outputs the link-type content by reproducing the acquired content data.

The content reproduction apparatus 100 mainly includes a communication unit 110 and a control unit 120.

The communication unit 110 is a communication interface that connects the content reproduction apparatus 100 to an external apparatus in a wired or wireless manner. In FIG. 4, the communication unit 110 is connected only to the network 500. However, the communication unit 110 may be, for example, a communication interface connected to an input/output device (not shown). For example, when a mouse serving as an input device has a connector that conforms with a universal serial bus (USB) standard, the communication unit 110 may include a port and a host controller that conform with the USB standard.

The control unit 120 functions as an arithmetic processing device and a control device. The control unit 120 controls all of the operations of the content reproduction apparatus 100 in accordance with various programs. Further, the control unit 120 may be a microprocessor. For example, the control unit 120 mainly includes a display control unit 122, a control information acquisition unit 124, a reproduction control unit 126, and a reproduction processing unit 130. The above-described function of the control unit 120 is actually realized by reading a control program from a storage medium such as a read-only memory (ROM) or a random access memory (RAM), which stores a control program describing a processing order in which an arithmetic device such as a central processing apparatus (CPU) realizes the function, and analyzing the control program.

The display control unit 122 controls screen display of a display device (not shown). For example, when a user inputs an operation instruction using an input device (not shown), the display control unit 122 accesses the web server 200 in response to the operation instruction, acquires a content list screen, and displays the acquired content list screen on the display device. Further, when the reproduction control unit 126 reproduces a content, the display control unit 122 displays the reproduced content on the display device.

The control information acquisition unit 124 acquires the VSI which is control information of the content data. The control information acquisition unit 124 acquires the VSI corresponding to a link-type content designated by operation information input by the user using the input device, and then the VSI regarding a scenario designated by the VSI. At this time, when a scenario is transitioned to another scenario by an auto Event, the control information acquisition unit 124 automatically acquires the VSI of the scenario designated by the VSI. Conversely, when a scenario is designated not by an auto Event but by the input device operated by the user, the control information acquisition unit 124 acquires the VSI corresponding to the designated scenario. The auto Event which is a kind of Event will be described in detail later.

The reproduction control unit 126 controls the reproduction of the link-type content by controlling the reproduction processing unit 130. The link-type content includes a plurality of scenarios that each include content data and VSI which is control information regarding reproduction of the content data. As shown in FIG. 5, the VSI is generated for each scenario and is provided, for example, in the format of an XML document. The VSI includes information (the URL or the like of the content data of a scenario) necessary to reproduce and activate the scenario, a plurality of Event information used to transition from the scenario to another scenario, and token information used to authenticate a user or the like. The Event information includes bridge information in which at least one of a time range and a space range in which the transition to a branch scenario is effective defines a user interface configured to transition to another scenario and a single or plurality of branch information indicating another scenario. The branch information includes information (the URL or the like of VSI of a branch scenario) necessary to transition to a branch scenario divided from the scenario. The VSI of the branch scenario also includes the same information as the VSI. For example, the VSI of the branch scenario may include information used to transition to a branch scenario further divided from the branch scenario.

The reproduction control unit 126 controls the reproduction of the link-type content by reproducing the content data in accordance with the VSI. As described above, the VSI includes URL information of the content data of the scenario and the URL of the VSI of the branch scenario. Therefore, when the control information acquisition unit 124 acquires the VSI of the branch scenario in accordance with the VSI of the scenario and the reproduction control unit 126 controls the reproduction of the content data in accordance with information of the content data included in the VSI acquired by the control information acquisition unit 124, the reproduction control unit 126 controls the reproduction of the link-type content.

The reproduction processing unit 130 performs a process of reproducing the content data under the control of the reproduction control unit 126. The reproduction processing unit 130 includes, for example, a decoder that decodes the content data. The reproduction processing unit 130 has been described as one function of the control unit 120 in FIG. 4, but the present invention is not limited thereto. For example, a part or the entirety of the reproduction processing unit 130 may be realized by hardware.

Web Server 200

The web server 200 is a server apparatus that provides a screen for a list of the contents to be reproduced by the content reproduction apparatus 100. The web server 200 mainly includes a display control unit 210 and a communication unit 220. The communication unit 210 is a communication interface that connects the web server 200 to another apparatus. The display control unit 210 controls display of a screen provided to the content reproduction apparatus 100. Specifically, the display control unit 210 generates a screen including the list of the contents provided by the content server 400 and provides the screen to the content reproduction apparatus 100.

VSI Server 300

The VSI server 300 is a server apparatus that provides the VSI which is control information for each scenario of the link content. The VSI server 300 provides the VSI in response to a request of the content reproduction apparatus 100. The VSI server 300 mainly includes a communication unit 310, an input/output control unit 320, and a VSI storage unit 330.

The communication unit 310 is a communication interface that connects the VSI server 300 to another apparatus. The input/output control unit 320 controls input and output of data in the VSI server 300. The input/output control unit 320 analyzes a VSI acquisition request message from the content reproduction apparatus 100, extracts the VSI of a scenario from the VSI information storage unit 330 in response to the VSI acquisition request message, and provides the extracted VSI to the content reproduction apparatus 100.

Content Server 400

The content server 400 is a server apparatus that provides the content data of each scenario included in the link-type content. When the provided content is a normal content, one provider provides one content. However, one link-type content is sometimes generated by a plurality of providers, since content data of the VSI may be generated for each scenario by different providers. Therefore, the content server 400 may be a different server apparatus for each provider. The same is applied to the VSI server 300.

The content server 400 mainly includes a communication unit 410, an input/output control unit 420, and a content data storage unit 430. The content server 400 analyzes a content data acquisition request message transmitted from the content reproduction apparatus 100 to the content server 400 with reference to the VSI, extracts the content data of the scenario in response to the content data acquisition request message from the content data storage unit 430, and provides the content data to the content reproduction apparatus 100.

3. Definitions of Terminology

Next, definitions of terminology for constituent elements of the link-type contents will be described with reference to FIG. 6.

Figure 6:
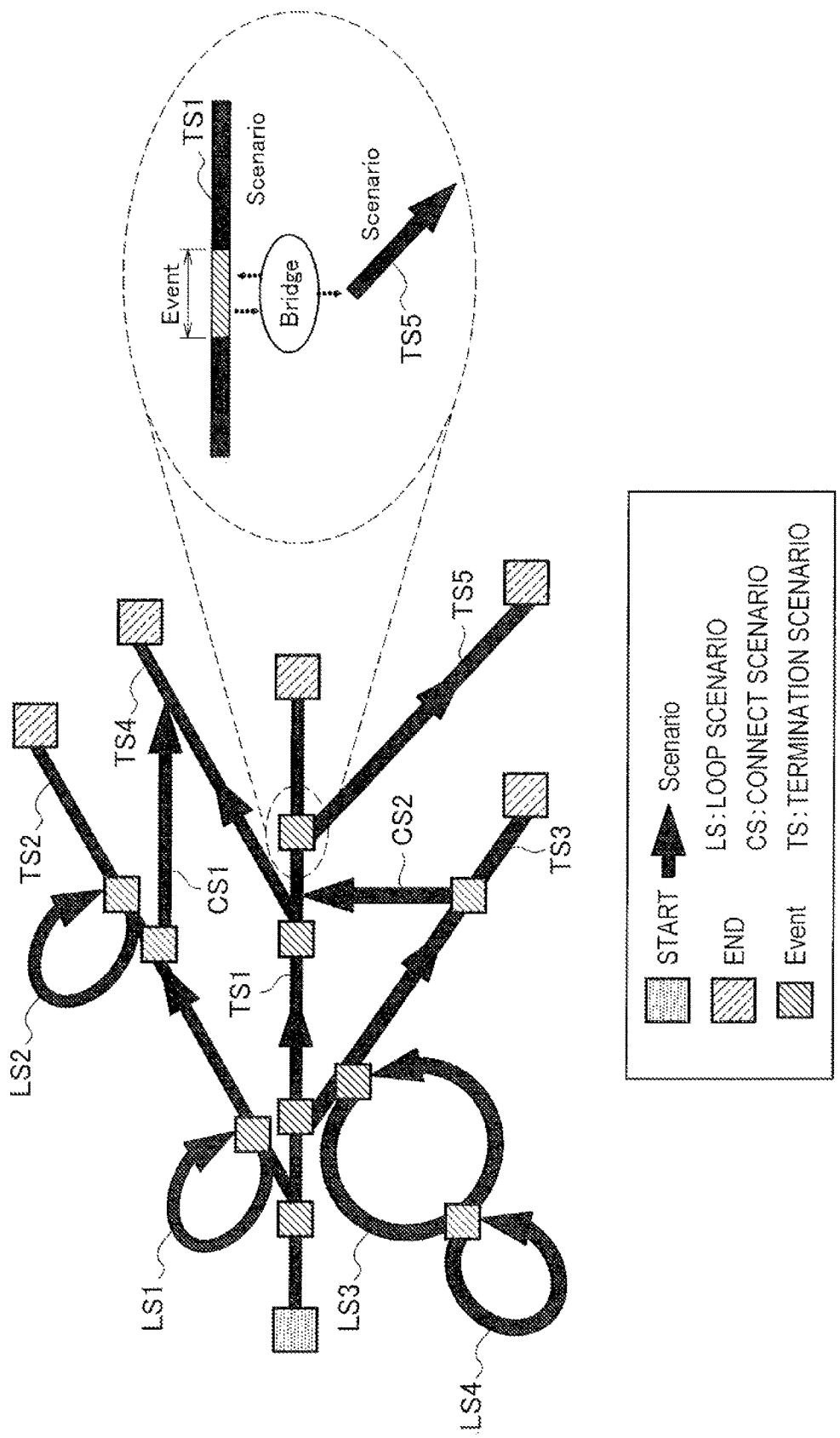
FIG. 6 is a diagram for describing definitions of terminology.

As shown in FIG. 6, the link-type content includes a plurality of scenarios. The scenario is established by one time axis and is a part of the link-type content. The scenario normally becomes one stream. The scenario includes one content file and one VSI file which is a metadata file of the content file and in which the VSI is described. The link-type content shown in FIG. 6 includes eleven scenarios of TS1 to TS5, LS1 to LS4, CS1, and CS2.

In the scenario, a temporal location (time range) or a spatial location (space range) at which the scenario can transition to another scenario is referred to as an Event. Event information which is information regarding an Event includes bridge information that defines a user interface during the transition from the scenario to another scenario and information regarding a branch scenario which is another scenario from the viewpoint of the scenario. For example, scenarios TS2, TS3, TS4, and TS5 are referred to as branch scenarios from the viewpoint of the scenario TS1. Further, the scenarios LS1, CS1, and LS2 are branch scenarios from the viewpoint of the scenario TS2 which is a branch scenario from the viewpoint of the scenario TS1.

The bridge information includes information regarding user authentication for whether to transition to another scenario, information regarding an operation such as selection when a plurality of scenarios are linked, and information regarding designation of display of the entire screen.

4. Kinds of Scenarios

Next, the scenarios included in the link-type content reproduced in the content reproduction system 10 according to the embodiment will be described with reference to FIGS. 7 to 11.

First, a scenario refers to one reproduction unit that is reproduced along a single time axis. The link-type content reproduced in the content reproduction system 10 according to the embodiment is configured such that a plurality of scenarios are basically linked. At this time, for example, a moving image, a still image, a slide show, or an application is used as the content data of each scenario.

The reproduction of one scenario continues until the content data of the scenario starts to be reproduced and is divided, stopped, or ended. Examples of operations of a remote controller during the reproduction of the scenario include a Stop operation, an Enter operation, a Pause operation, an FF operation, an FR operation, a Skip operation, and a Play operation.

The Stop operation is an operation that is performed to stop the reproduction. When the Stop operation is performed, the reproduction of the link-type content is stopped and a current screen returns to a screen before activation of the link-type content.

The Enter operation is performed, for example, to check the division of the scenario within an Event target temporal range (or spatial range). When the Enter operation is performed within the Event target temporal range or spatial range, a bridge screen is displayed.

The Pause operation, the FF operation, and the FR operation are the same as those in normal reproductions of a content. That is, when the Pause operation is performed, the reproduction of a content being reproduced is temporarily stopped. The FF operation and the FR operation are optional operations. When a content corresponds to the FF operation and the FR operation and the FF operation is performed, the content being reproduced is fast forwarded. When the FR operation is performed, the content being reproduced is rewound.

When the Skip operation is performed during the reproduction of the content, a current scene is skipped to a scene at the subsequent Event starting point. The Play operation is used to resume the reproduction of the content of the scenario being reproduced from the Pause operation.

Classification According to Media Type of Scenario

As described above, for example, a moving image, a still image, a slide show, or an application is used as the content data of a scenario.

A moving image scenario is a scenario that is configured by a moving image content of a moving image and an audio. At this time, the moving image corresponds to at least one of a 2-dimensional (D) content and a 3D content. For example, in the link-type content shown in FIG. 7, when the content data of each scenario is a 2D content, a reference numeral 2D is added after a reference numeral of a scenario via a hyphen to indicate a 2D content. Likewise, when the content data of each scenario is a 3D content, a reference numeral 3D is added after a reference numeral of a scenario via a hyphen to indicate a 3D content.

Figure 7:
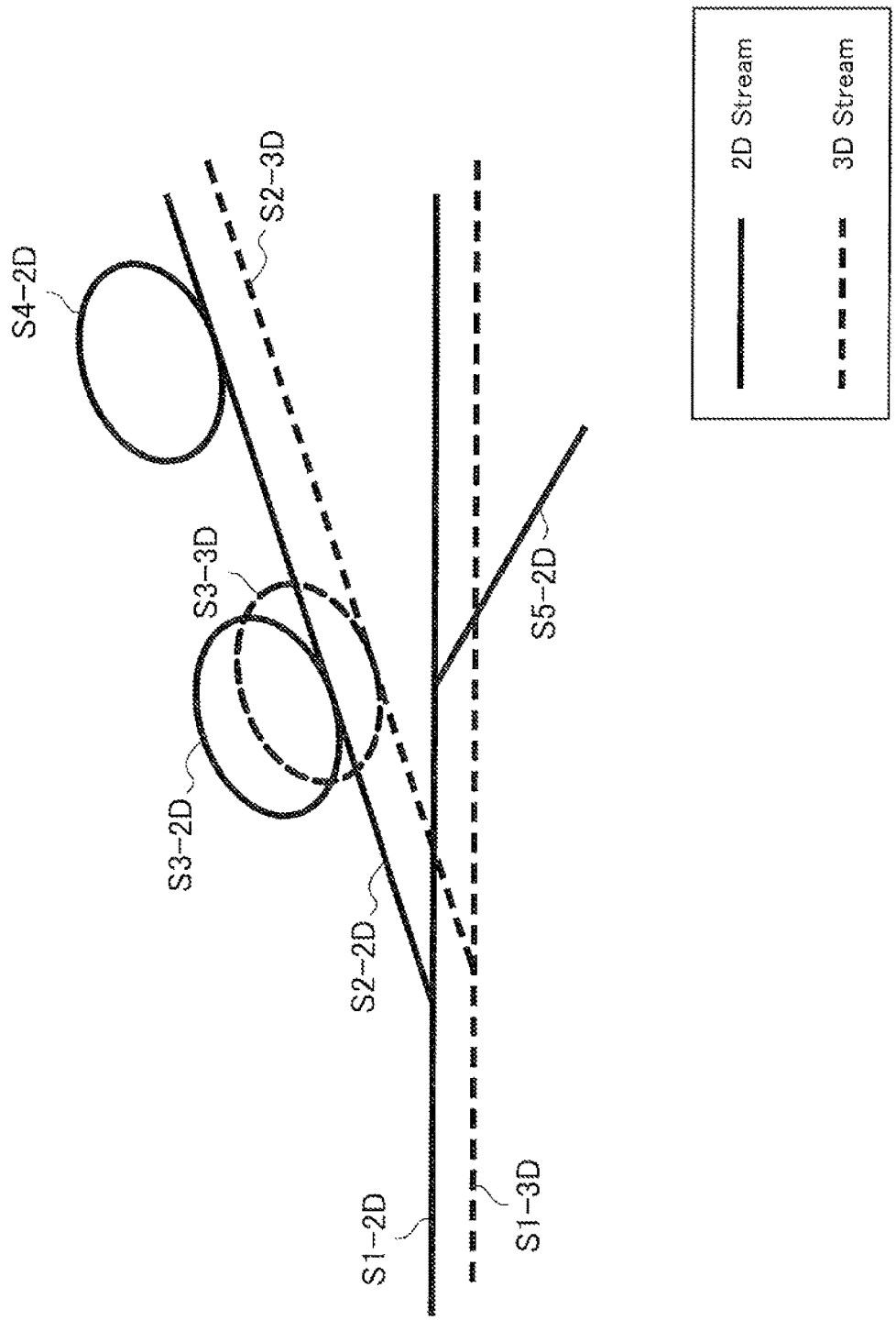
FIG. 7 is a diagram illustrating an example of a content in which both 2D content data and 3D content data are provided.

For example, in the link-type content shown in FIG. 7, a scenario S1, a scenario S2, and a scenario S3 have both 2D data and 3D data. Conversely, a scenario S4 and a scenario S5 have only 2D data. When the link-type content is reproduced and the content reproduction apparatus 100 does not correspond to the reproduction of a 3D content, the reproduction control unit 126 of the content reproduction apparatus 100 normally reproduces the content data with reference to 2D content data. On the other hand, when the content reproduction apparatus 100 corresponds to the reproduction of a 3D content and, for example, 3D content data is present, the reproduction control unit 126 may automatically select the 3D content data. At this time, for example, when only 2D content data is present as in the scenario S4, the reproduction is preferably switched automatically to the reproduction of 2D content data.

At present, 2D content data is mainly used. A reproduction apparatus corresponding to the reproduction of 3D content data is not commonly used. Therefore, when 3D content data is provided, 2D content data is also preferably provided. The presence or absence of 3D correspondence can be set in a scenario unit.

In the reproduction of the moving image scenario, the final image of the moving image is displayed, and then an escape from the moving image scenario is preferable, for example, by transiting to the original scenario or ending the link-type content. Further, when an Event is designated by the VSI, a bridge screen of another designated scenario is displayed by performing the Enter operation within an intended time (or intended space) of an Event.

The still image scenario is a scenario that is configured in one still image having the JPEG format or the like. When the still image scenario is reproduced, a still image which is content data is displayed on the entire screen. The classification according to the link types of scenarios will be described later, but the still image scenario can be applied to all link types of scenarios. In the still image scenario, when the user performs the Enter operation during the reproduction of a scenario, the scenario escapes. Further, when an Event is designated by the VSI of the still image scenario and the user performs the Enter operation, a bridge screen to another designated scenario is displayed.

The slide show scenario is a scenario that is configured by a single or plurality of still images. When the slide show scenario is reproduced, a still image which is content data is displayed on the entire screen. Then, the display of each still image is switched sequentially at predetermined time intervals. When the final still image included in slide show content data is displayed, for example, the slide show scenario returns to the original scenario or the link-type content ends, the reproduction of the slide show scenario ends.

The application scenario is a scenario that is configured by an application. Examples of the application used here include widget applications and Java (registered trademark) applications.

Classification According to Link Type of Scenario

Scenarios included in the link-type content reproduced in the content reproduction system 10 according to this embodiment are classified into three types, a loop scenario, a connect scenario, and a termination scenario mainly according to behaviors when the scenarios end.

Figure 8:
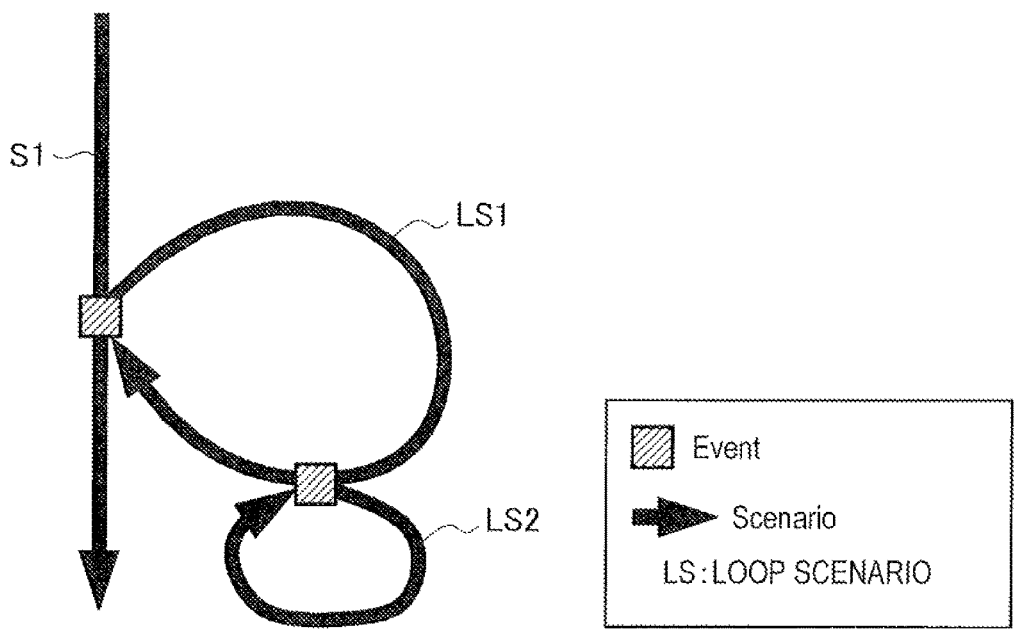
FIG. 8 is a diagram illustrating loop scenarios.

First, as shown as a loop scenario LS1 in FIG. 8, the loop scenario refers to a scenario that returns to a transition point of the same scenario when the a scenario S1 transitions at a given time point and the reproduction of the scenario ends. When the loop scenario starts to be reproduced, the reproduction control unit 126 of the content reproduction apparatus 100 retains information (resuming information) regarding the transition point of the scenario of a transition source and VSI (a main portion of the VSI or URL information of the VSI) of the scenario of the transition source and automatically resumes the reproduction of the original scenario after the reproduction of the loop scenario ends.

For example, in the link-type content shown in FIG. 8, when the scenario S1 transitions to a loop scenario LS1 during the reproduction of the scenario S1 and the loop scenario LS1 further transitions to a loop scenario LS2, the reproduction control unit 126 of the content reproduction apparatus 100 retains resuming information at the transition time point from the loop scenario LS1 to the loop scenario LS2 as well as resuming information and the VSI at the transition point from the scenario S1 to the loop scenario LS1.

On the other hand, when transition to a branch scenario other than the loop scenarios is performed, for example, in a halfway Event, the reproduction control unit 126 may delete the retained resuming information and the retained VSI due to absence of the return to the original transition point.

Figure 9:
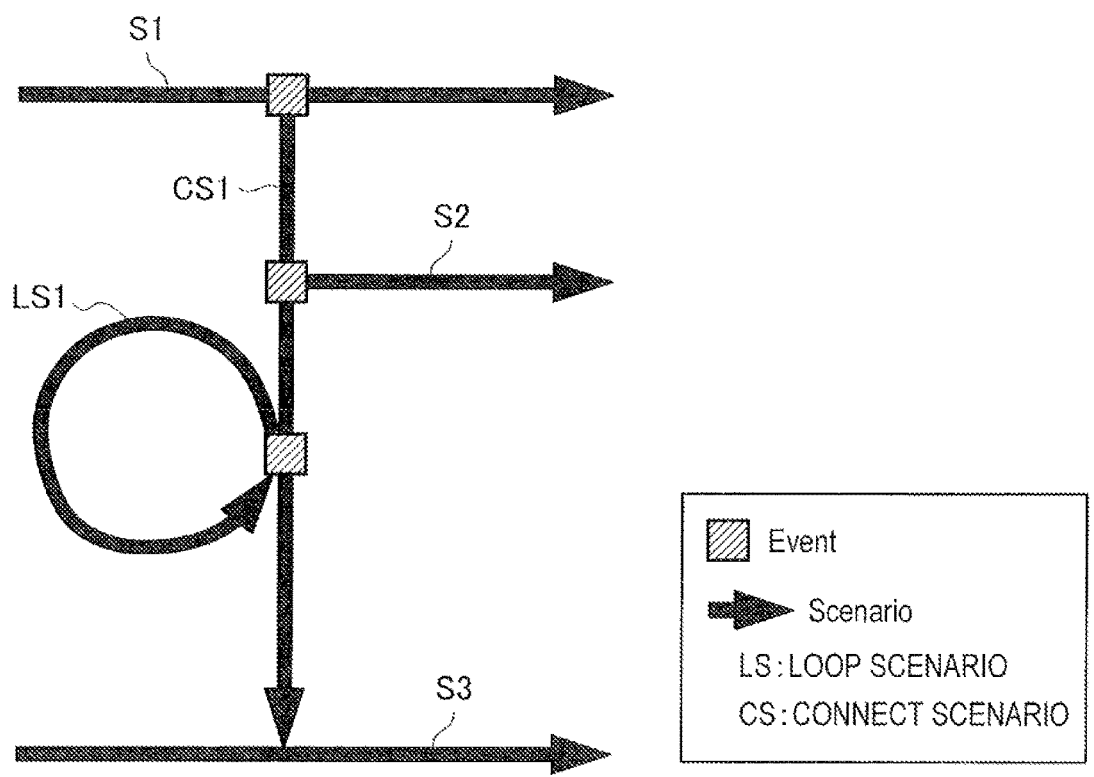
FIG. 9 is a diagram illustrating a connect scenario.
Figure 10:
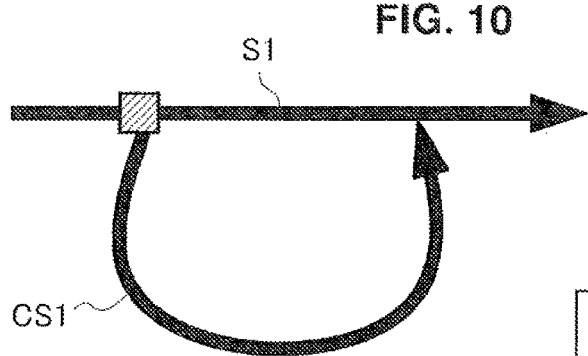
FIG. 10 is a diagram illustrating another example of the connect scenario.

Next, the connect scenario refers to a scenario different from the transition source when the reproduction of the scenario ends, or a scenario transitioned to another temporal location of the scenario of the transition source. FIG. 9 shows an example of a connect scenario CS1 transitioned to a scenario different from the transition source. FIG. 10 shows an example of the connect scenario CS1 transitioned from the scenario S1 and transitioned to another temporal location of the same scenario S1. When the reproduction of the connect scenario ends, the connect scenario is preferably frozen to the screen when the reproduction ends in order to smoothly transition to the reproduction of a scenario of a transition destination. Further, the connect scenario is different from the loop scenario in that it is not necessary to retain the information regarding the transition point and the VSI of the scenario of the transition source in the activation of the connect scenario, when the connect scenario transitions from another scenario.

Figure 11:
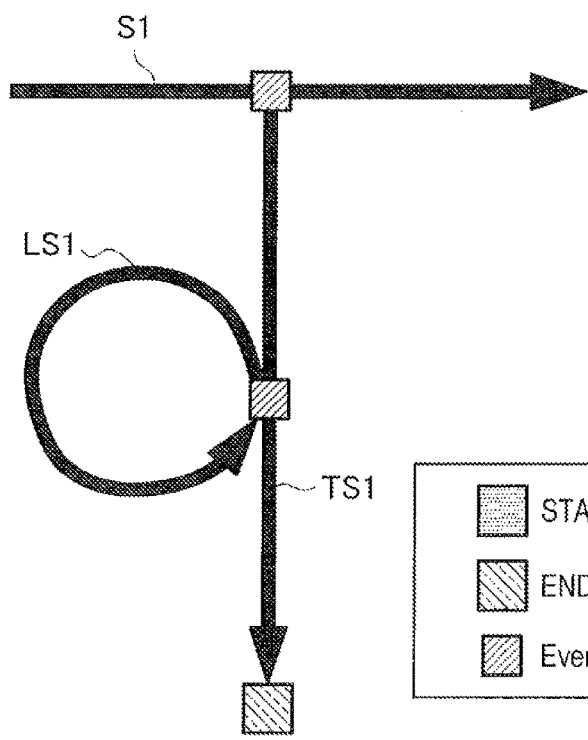
FIG. 11 is a diagram illustrating a termination scenario.
Figure 12:
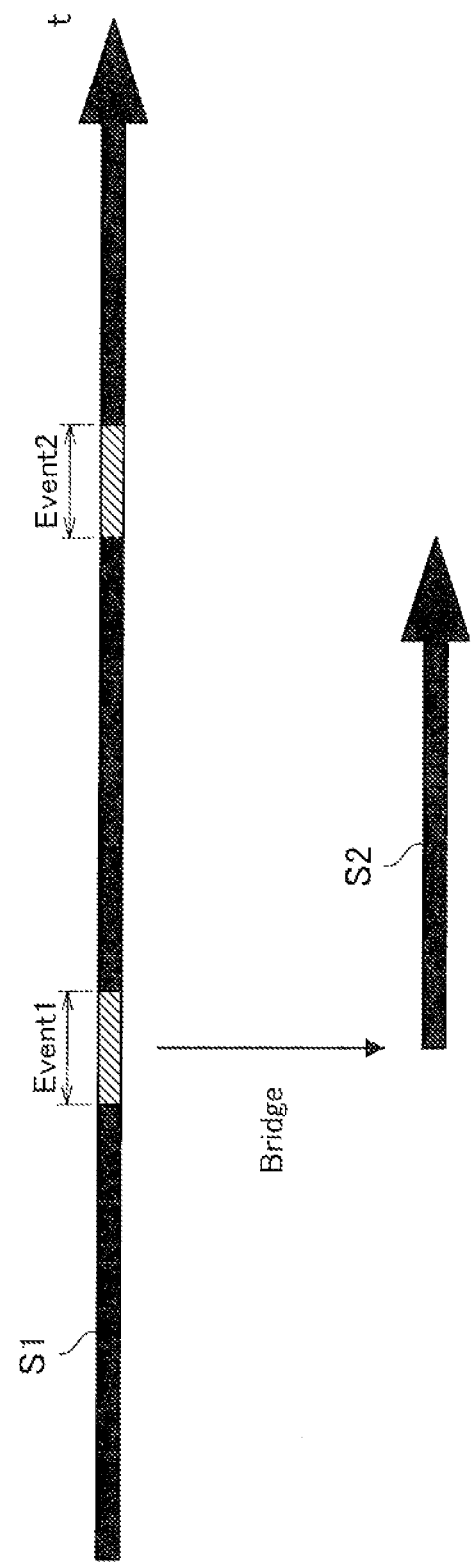
FIG. 12 is a diagram illustrating a temporal Event.

The termination scenario refers to a scenario for which the reproduction of the link-type content ends when the reproduction of the scenario ends. For example, a scenario TS1 that is a branch scenario of the scenario S1 and is a termination scenario is shown in FIG. 11. As in the connect scenario, it is not necessary to retain the information regarding the transition point in the activation of the termination scenario and the VSI of the scenario of the transition source, when the termination scenario transitions from another scenario.

Since there is a probability that each scenario is generated separately by a plurality of providers, it is important to define operational rules for such a content. For example, the rule for transition between scenarios is considered as follows.

When transition between scenarios is performed by a halfway Event of a scenario, any type of scenario may basically transition to any type of scenario. However, when a loop scenario transitions in multiple stages from the viewpoint of management, the limitation on the number of stages is preferably set. When a loop scenario transitions to another type of scenario, as described above, the information regarding the transition point and the VSI of the scenario of the transition source are deleted.

Further, the following rule is preferably applied to transition when a scenario ends. For example, a connect scenario can transition to a connect scenario or a termination scenario by an Event when the scenario ends. A loop scenario transitions at a transition time point of the scenario of the transition source according to the definition, when the reproduction ends. When the reproduction of the termination scenario ends, a termination scenario does not transition to any scenario, and thus the reproduction of the link-type content ends.

5. Kinds of Events

Next, the kinds of Events will be described with reference to FIGS. 12 to 17. First, an Event refers to a partial section of a time or a space of the scenario and functions as a link of transition to another scenario.

The Event is classified into three kinds of Events: a temporal Event, a spatial Event, and a spatiotemporal Event. Basically, the Event is used to transition to another scenario when a user performs an operation within a section defined by a time or a space. However, an auto Event used to automatically transition to another scenario without a user's operation is also defined.

First, the temporal Event refers to a time zone partitioned by a starting point and an ending point on the time axis of a scenario. In the VSI, the temporal Event is defined by the starting point and the ending point. For example, when a scenario S1 is linked to a scenario S2 at Event 1, as in FIG. 12, and a user performs an Enter operation during the reproduction of the scenario S1, the reproduction control unit 126 of the content reproduction apparatus 100 determines whether a time point at which the user performs an Enter operation is within an Event section designated by the VSI. When the reproduction control unit 126 determines that the time at which the user performs the Enter operation is within the Event section designated by the VSI, the reproduction control unit 126 causes the display control unit 122 to display a bridge screen designated by the VSI. Then, the reproduction control unit 126 reproduces another scenario S2 designated by a user's operation.

Figure 13:
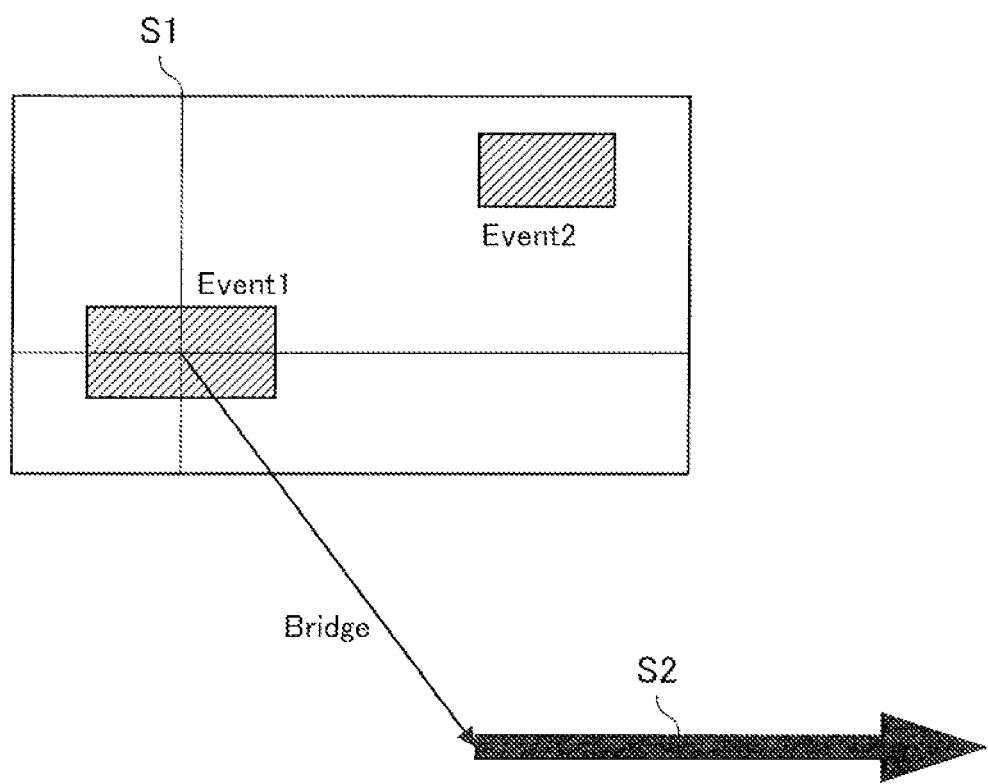
FIG. 13 is a diagram illustrating a spatial Event.

The spatial Event refers to an Event indicated by a region on a screen space of a scenario. In the VSI, the spatial Event is defined by the upper left coordinate and the lower left coordinate of a rectangular region. The spatial event is mainly used when a scenario is a still image scenario. Alternatively, when a scenario is a moving image scenario and an event is effective in the entire time section of the scenario, the event is referred to as the spatial event. For example, as shown in FIG. 13, two events, Event 1 and Event 2, are defined in a still image scenario S1. When the user performs an Enter operation during the reproduction of the still image scenario S1, the reproduction control unit 126 determines whether the position of a cursor at the time point at which the user performs the Enter operation is within a rectangular region of an event defined by the VSI. When the reproduction control unit 126 determines that the position of the cursor is within the rectangular region of the event, the reproduction control unit 126 causes the display control unit 122 to display a bridge screen designated by the VSI. Further, when a scenario is designated by a user's operation, the reproduction control unit 126 starts reproducing another scenario S2 designated by the user's operation.

Figure 14:
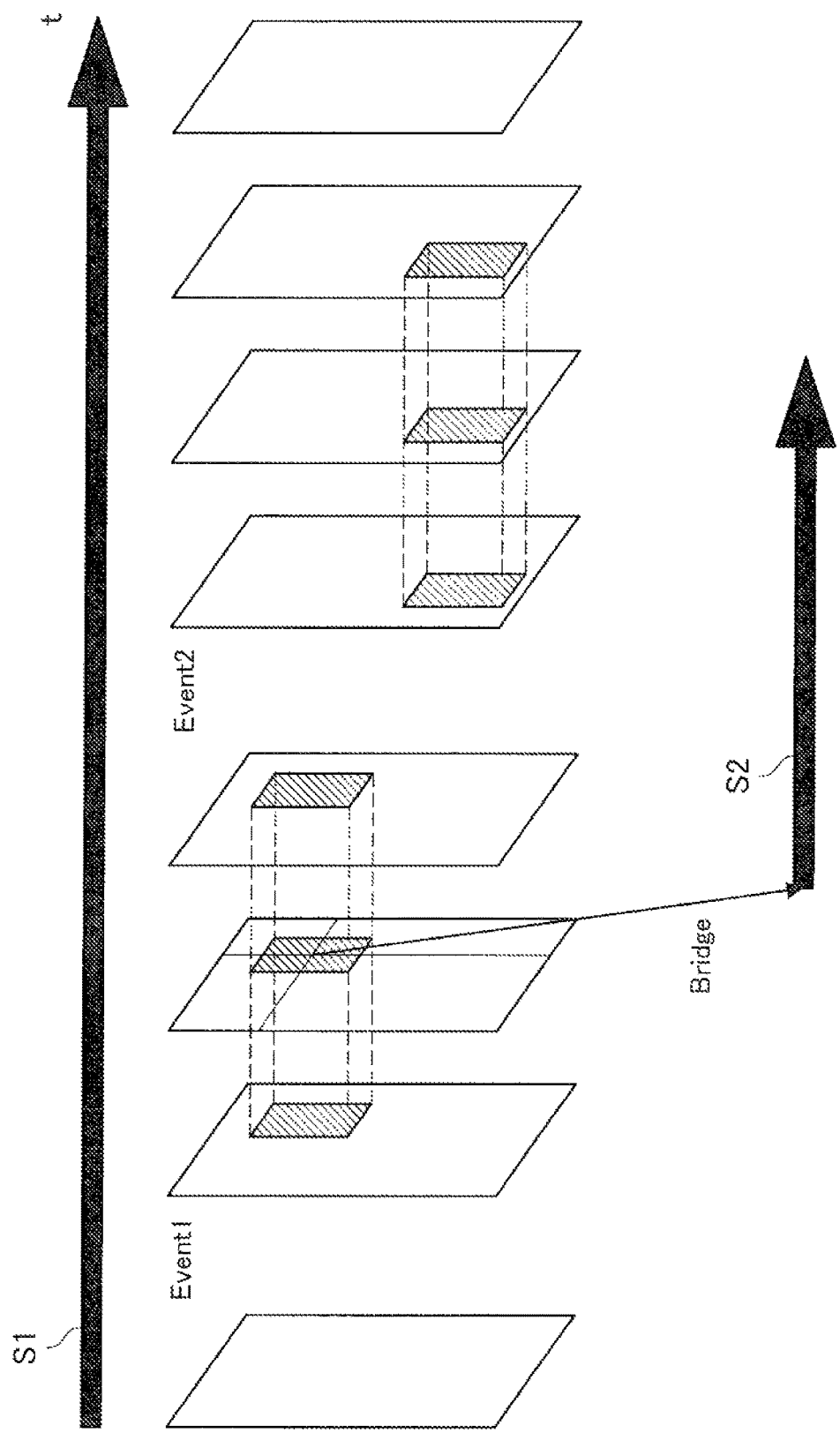
FIG. 14 is a diagram illustrating a spatiotemporal Event.

The spatiotemporal event refers to an event indicated by a rectangular region on a screen space within a time on the time axis of a scenario. In the VSI, the spatiotemporal event is defined by the starting and ending points of the time axis and the upper left and lower right coordinates of the rectangular region on the screen. The spatiotemporal event is effective only when the scenario is a moving image scenario having time and space concepts. FIG. 14 shows spatiotemporal Event 1 and Event 2 in a scenario S1. When the user performs an Enter operation during the reproduction of the scenario S1, the reproduction control unit 126 determines whether the time point at which the user performs the Enter operation is within a time range of an event defined by the VSI and determines whether the position of a cursor at the time point at which the user performs the Enter operation is within the space range of the event defined by the VSI. When the reproduction control unit 126 determines that the time point within time range of the event and the position of the cursor is within the space range of the event, the reproduction control unit 126 causes the display control unit 122 to display a bridge screen designated by the VSI. Further, when a scenario is designated by a user's operation, the reproduction control unit 126 starts reproducing another scenario S2 designated by the user's operation.

For example, when the reproduction control unit 126 recognizes a spatial event or a spatiotemporal event in the VSI, the reproduction control unit 126 may perform control such that the cursor is displayed on a display screen. A method of displaying the cursor is dependent on implementation. However, for example, the cursor may be configured to be moved on a screen by upper, lower, right, and left keys of an input device such as a remote controller.

The temporal event, the spatial event, and the spatiotemporal event, that is, the events used to transition from a scenario to another scenario mainly by a user's operation, have been described. In addition to the events used to transition from a scenario to another scenario by a user's operation, an auto event used to automatically transition from a scenario to another scenario is also defined. Next, the auto event will be described.

The auto event refers to an event used to transition a scenario to another scenario automatically regardless of a user's operation. When the auto event is defined by the VSI and the reproduction control unit 126 of the content reproduction apparatus 100 recognizes that a scenario enters a time range defined by the auto event, the reproduction control unit 126 interrupts the reproduction of the scenario automatically regardless of a user's operation, displays a bridge screen, and transitions the scenario to another scenario.

Figure 15:
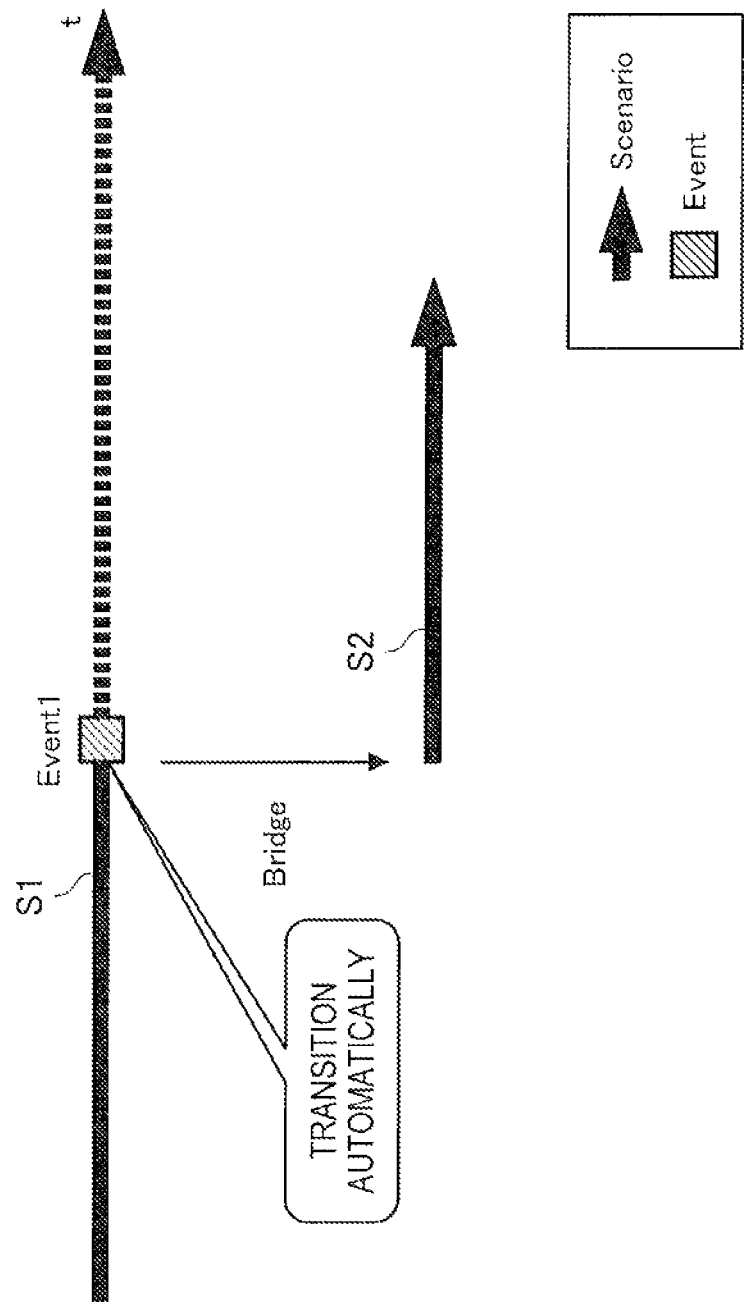
FIG. 15 is a diagram illustrating an auto Event using the termination scenario.
Figure 16:
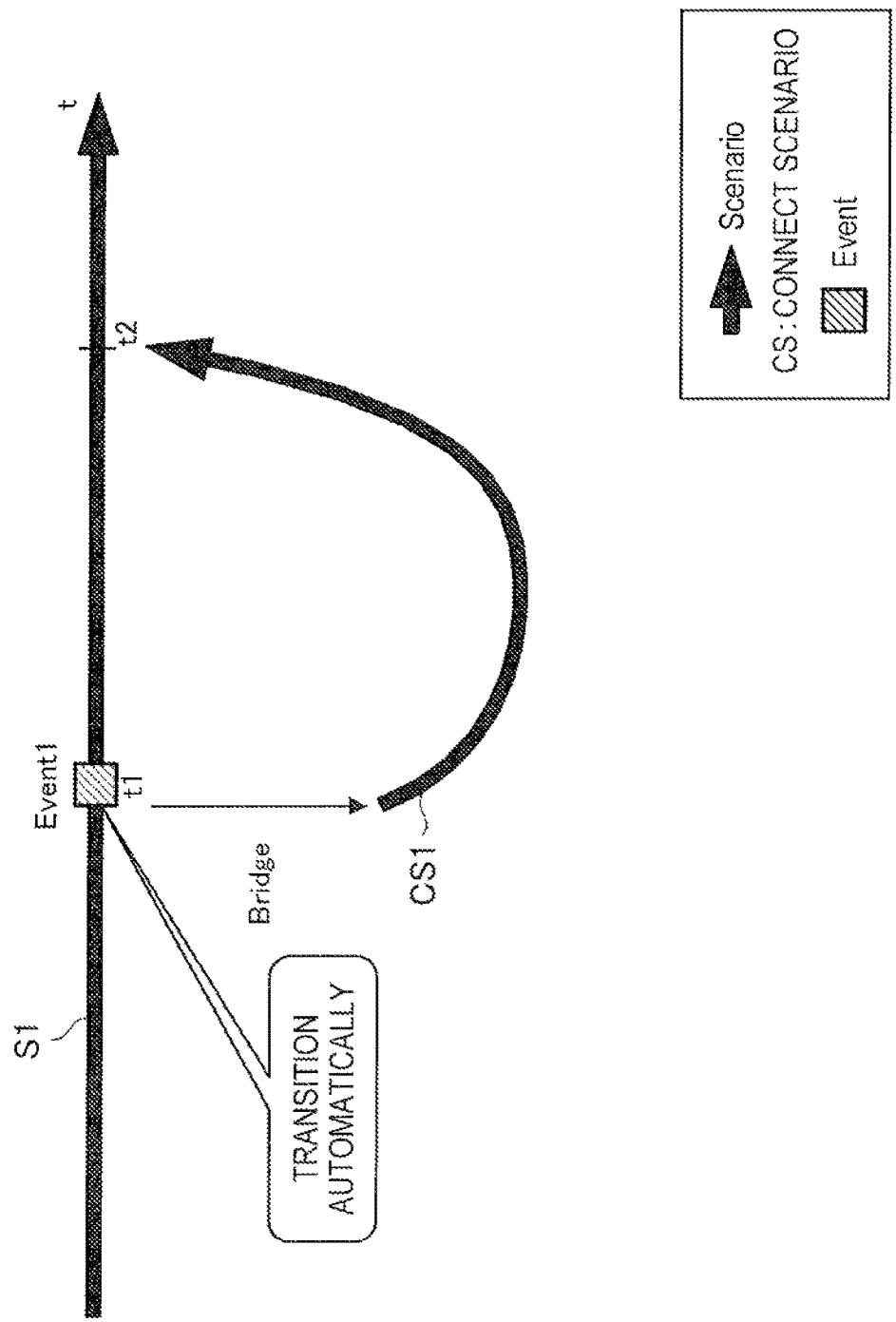
FIG. 16 is a diagram illustrating an auto Event using the connect scenario.

For example, Event 1 is defined as an auto event in a scenario S1 shown in FIG. 15. When the reproduction control unit 126 of the content reproduction apparatus 100 currently reproducing the scenario S1 recognizes that the scenario S1 enters the range of Event 1 defined by the VSI of the scenario S1, the reproduction control unit 126 displays a bridge screen defined by the VSI and then starts reproducing the scenario S2 automatically. The auto event, Event 1, is used, for example, when a moving image after a given time point in the scenario S1 is desired to be replaced.

For example, a scenario of a transition destination of the auto event may be a connect scenario. For example, when a scenario S1 is defined such that the scenario automatically transitions to a connect scenario CS1 which is an auto scenario from a given time point t1, the reproduction of the connect scenario CS1 ends, and then the connect scenario CS1 transitions to the original scenario S1 at a time point t2, as in FIG. 16, a moving image between the time point t1 to the time point t2 of the scenario S1 can be replaced with the details of the connect scenario CS1. Such a scenario can be applied to a scenario in which a parental lock is set. That is, only when the parental lock is set, an auto event is configured to be effective and a content from the time point t1 to the time point t2 which includes the details inappropriate for children can be replaced with the details of the connect scenario CS1.

Figure 17:
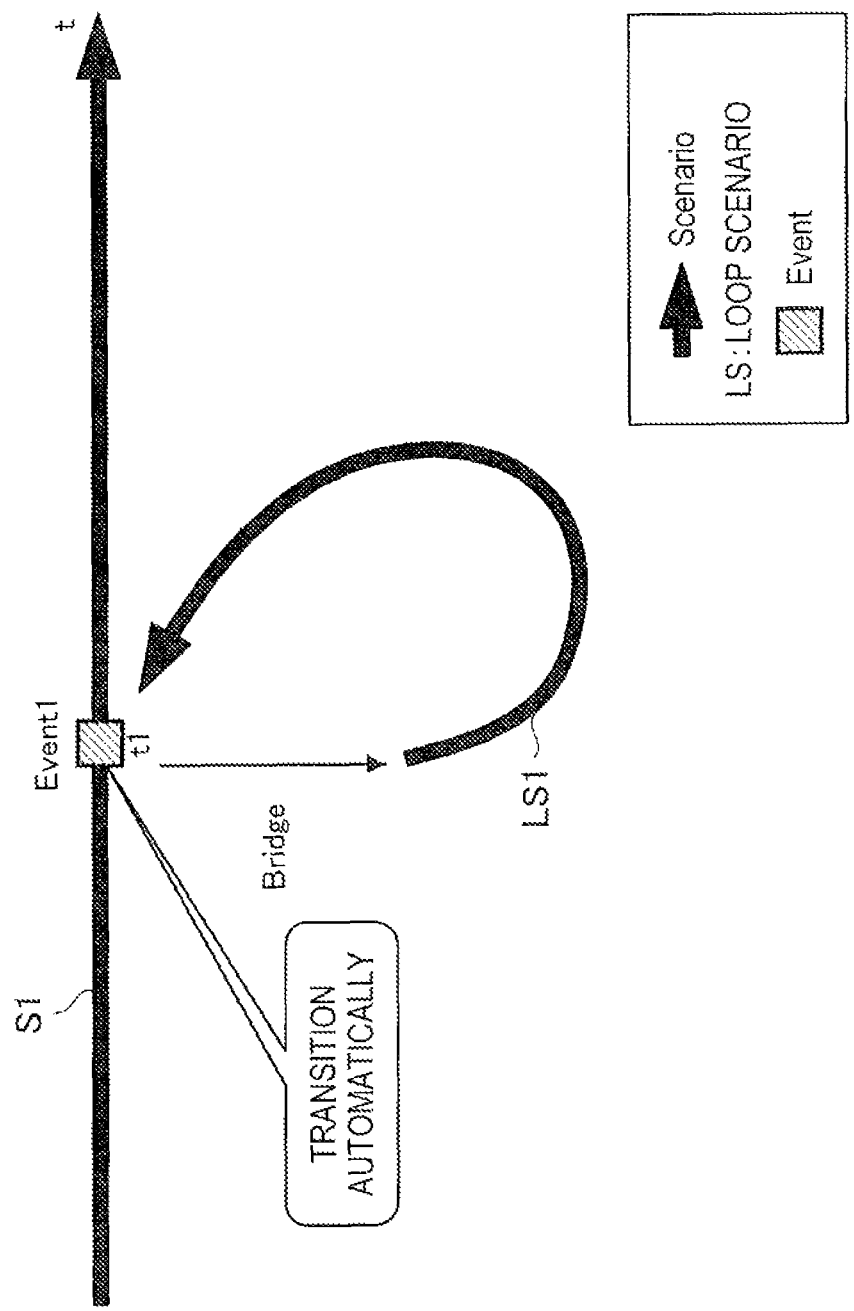
FIG. 17 is a diagram illustrating an auto Event using the loop scenario.

Alternatively, the scenario of the transition destination of the auto event may be a loop scenario. For example, as shown in FIG. 17, a loop scenario LS1 is defined as an auto scenario at a given time point t1 of a scenario S1. According to the loop scenario LS1, for example, a commercial message (CM) content can be inserted into the middle of the scenario S1. In the link-type content, a content can be replaced with another content at a halfway time point of a scenario S1 without editing the original scenario S1 by editing the VSI. Therefore, for example, when a loop scenario is a CM content, the details of the CM content can be replaced periodically. Alternatively, different CM contents can be displayed depending on users when the result of user authentication is used. For example, it can be easily realized that CM contents can be displayed depending on information regarding preference of users or no CM content is displayed to a user who pays a fee.

6. Patterns of Bridges

Figure 18:
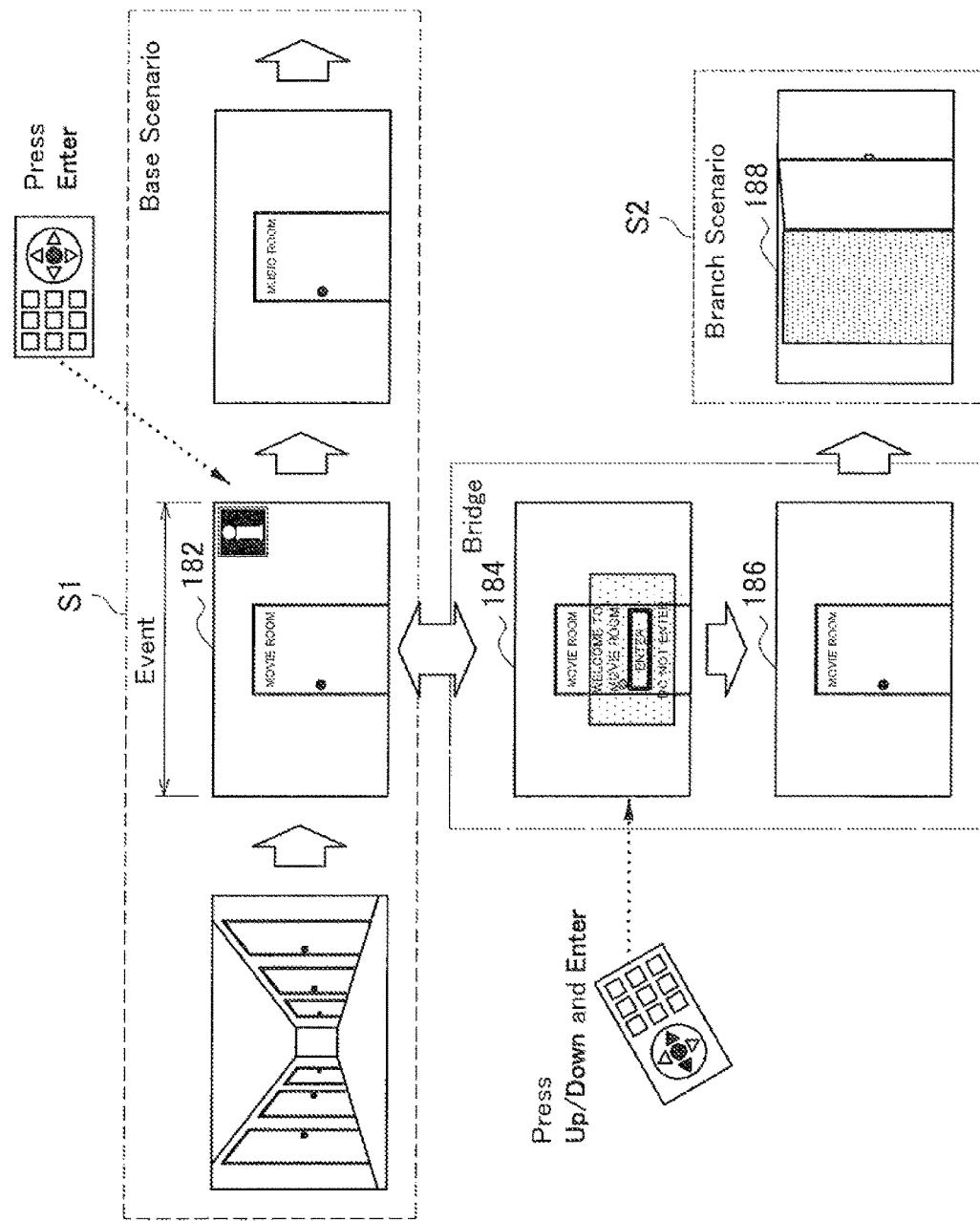
FIG. 18 is a diagram illustrating an example of a bridge.

Next, bridges included in event information will be described with reference to FIGS. 18 to 23. FIG. 18 is a diagram illustrating an example of a bridge.

A bridge is a UI in the division of a scenario and bridge information in the VSI is defined for each event. The bridge information defines a screen used in the division of the scenario and provided when a user performs an input operation in an event range or a scenario enters the event range of an auto event.

For example, when the user performs an Enter operation on an event screen 182 within an event range during reproduction of content data of a scenario S1 which is a base scenario in the example of FIG. 18, the reproduction control unit 126 causes the display control unit 122 to display a first bridge screen 184 defined by the bridge information.

On the first bridge screen 184 in FIG. 18, two options, that is, an option to transition to one branch scenario S2 and an option to return to the original base scenario, are displayed in a screen structure that is defined by the bridge information and includes the UI of a user's operation. Here, when the user performs an input operation of selecting the option to transition to the branch scenario S2, the reproduction control unit 126 causes the display control unit 122 to display a second bridge screen 186 from which the UI of the option is deleted. When the setup for starting reproduction of a branch scenario S2 is completed, the reproduction control unit 126 starts reproducing the branch scenario S2 and the display control unit 122 displays a branch scenario start screen 188.

The overview of the display of the bridge screen has been described. However, several patterns of the method of displaying the bridge screen can be considered. Therefore, four display patterns of the bridge screen will be described below. The same screen transition operation as the operation described in FIG. 18 is performed in the four display patterns to be described below with reference to FIGS. 19 to 22.

Figure 19:
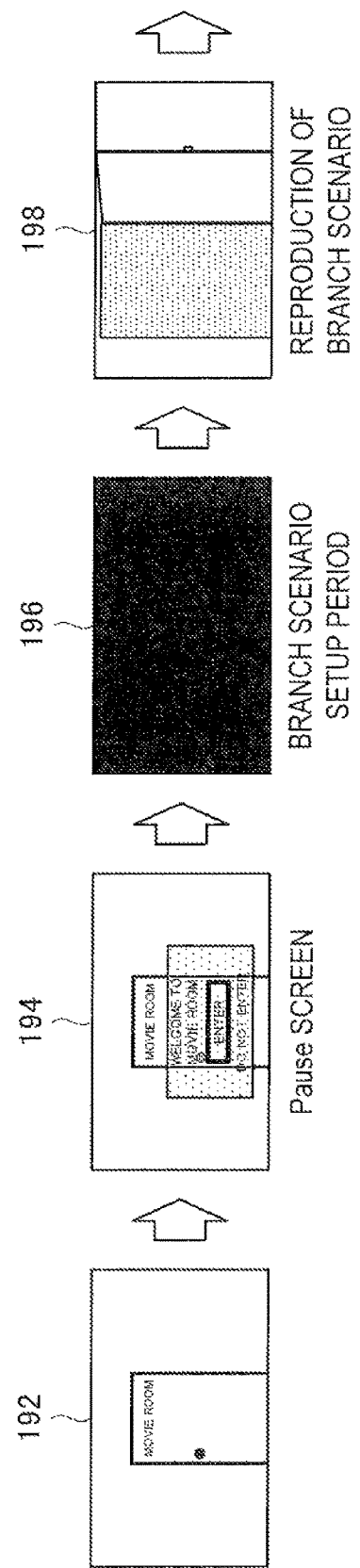
FIG. 19 is a diagram illustrating an example of a method of mounting a bridge screen.

First, a first pattern of the bridge screen display will be described with reference to FIG. 19. When the user performs an operation of activating an event on an event screen 192 of the scenario S1, the reproduction control unit 126 displays a bridge screen 194, in which an option providing display defined by the bridge information overlaps with a pause screen of the event screen 192 for the operation of activating the event. When the user selects the option to transition to the branch scenario on the bridge screen 194, the reproduction control unit 126 starts reproducing the branch scenario. However, a screen display of a setup period until the activation of the reproduction of the branch scenario S2 is dependent on implementation of a terminal. In many cases, the display of a screen 196 is generally set to be in a back image state during the setup period.

Figure 20:
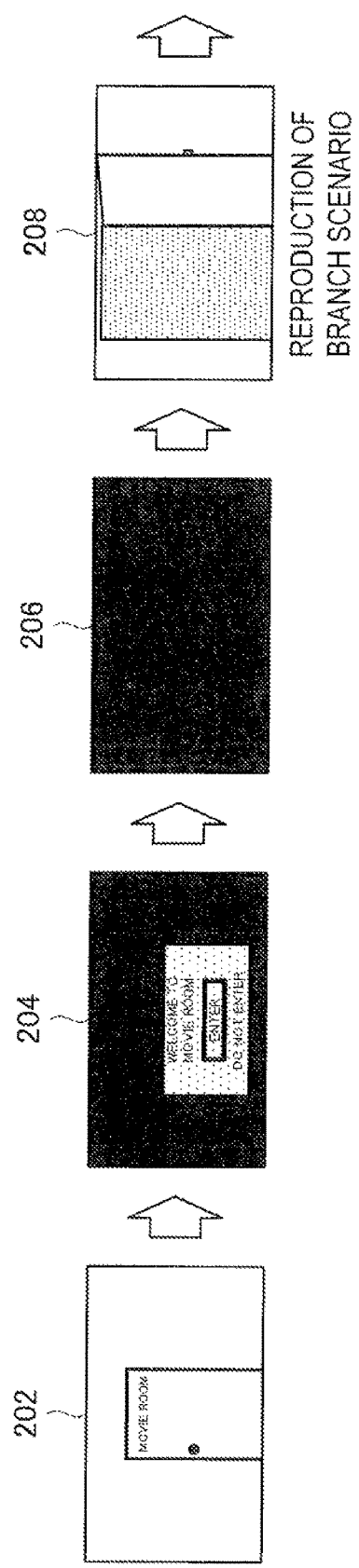
FIG. 20 is a diagram illustrating another example of the method of mounting a bridge screen.

A second pattern of the bridge screen display will be described with reference to FIG. 20. The second pattern of the bridge screen display is different from the first pattern in that the option providing display does not overlap with the pause screen, but the option providing display overlaps with a black image on the bridge screen 204. In the first and second patterns of the bridge screen display, the screen display of the setup period is set to be in the black image state until the activation of the reproduction of the branch scenario S2. These patterns are assumed to have an effect that the user can easily view the options by setting the background of the option display as the black image. However, when such a black image is interposed during the transition from a scenario to another scenario, continuity of a content view perspective may not be achieved, and thus natural scenario division may not be realized.

Accordingly, when a screen to be displayed is defined even during the setup period until the activation of the reproduction of the branch scenario S2, the continuity of the content view perspective can be achieved, and thus natural scenario division can be realized. Thus, a third pattern of the bridge screen display in which the display of a still image assumed even during the setup period is maintained will be described with reference to FIG. 21.

Figure 21:
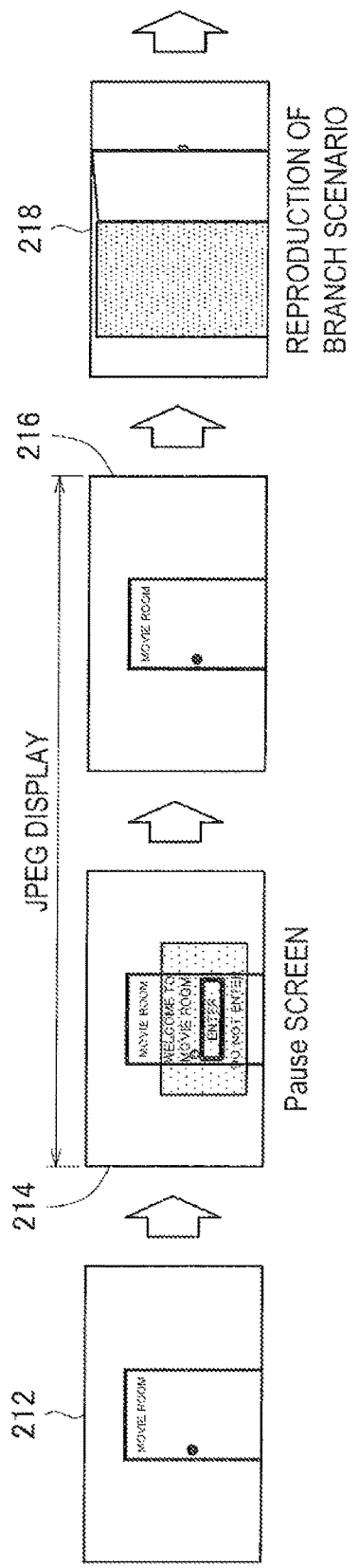
FIG. 21 is a diagram illustrating one other example of the method of mounting a bridge screen.

In the third pattern of the bridge screen display, when the user performs an operation of activating an event on an event screen 212, a first bridge screen 214 is displayed such that an option providing display overlaps with the entire display of a still image defined by the bridge information and corresponding to the pause screen in the operation of activating the event. Then, a second bridge screen 216 in which the overlapping option providing display is deleted from the first bridge screen is displayed during the setup period in which the user selects the option to transition to the branch scenario on the first bridge screen 214 and the reproduction of the branch scenario S2 starts. The background of the first bridge screen 214 and the second bridge screen 216 are still images such as JPEG. In the example of FIG. 21, the still images are assumed to be images corresponding to the pause screen in the operation of activating the event. However, the present invention is not limited thereto. For example, an image different from the pause screen may be defined by the bridge information of a separate VSI.

Figure 22:
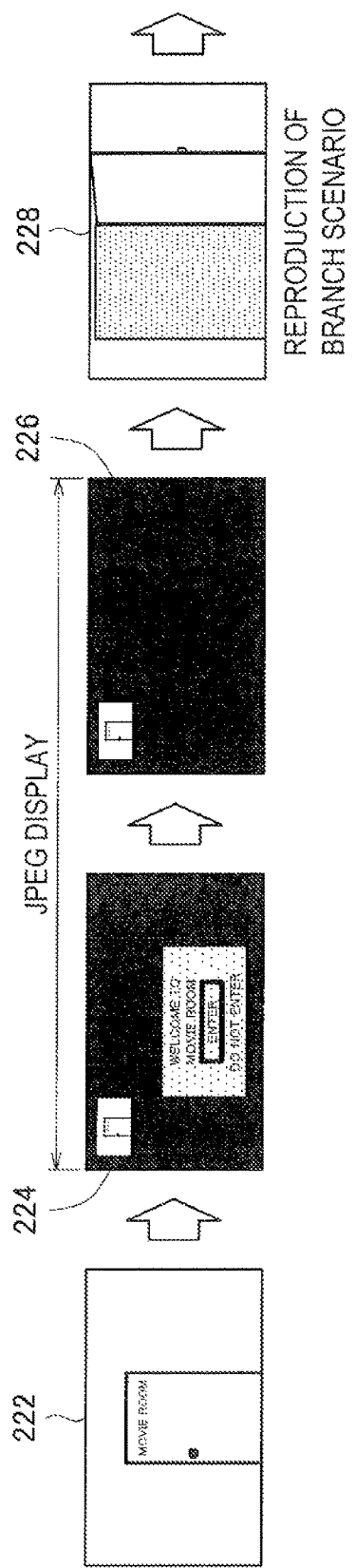
FIG. 22 is a diagram illustrating one other example of the method of mounting a bridge screen.

A fourth pattern of the bridge screen display in which a background image likewise forming the bridge screen is defined will be described with reference to FIG. 22. In the third pattern of the bridge screen display, the still image on the bridge screen is displayed on the entire screen. In the fourth pattern, the still image on the bridge screen is displayed on a part of the screen. In this pattern, an effect that the user can easily view the options can be expected by displaying the options against the background of the black image, compared to the third pattern.

As described in the third and fourth patterns, a structure for switching between output images by displaying the bridge screen using the still image is necessary in order to provide a screen in which the continuity of the content view perspective is achieved even during the setup period. Next, the configuration of the content reproduction apparatus 100 capable of realizing the third and fourth patterns of the bridge screen display will be described with reference to FIG. 23.

Figure 23:
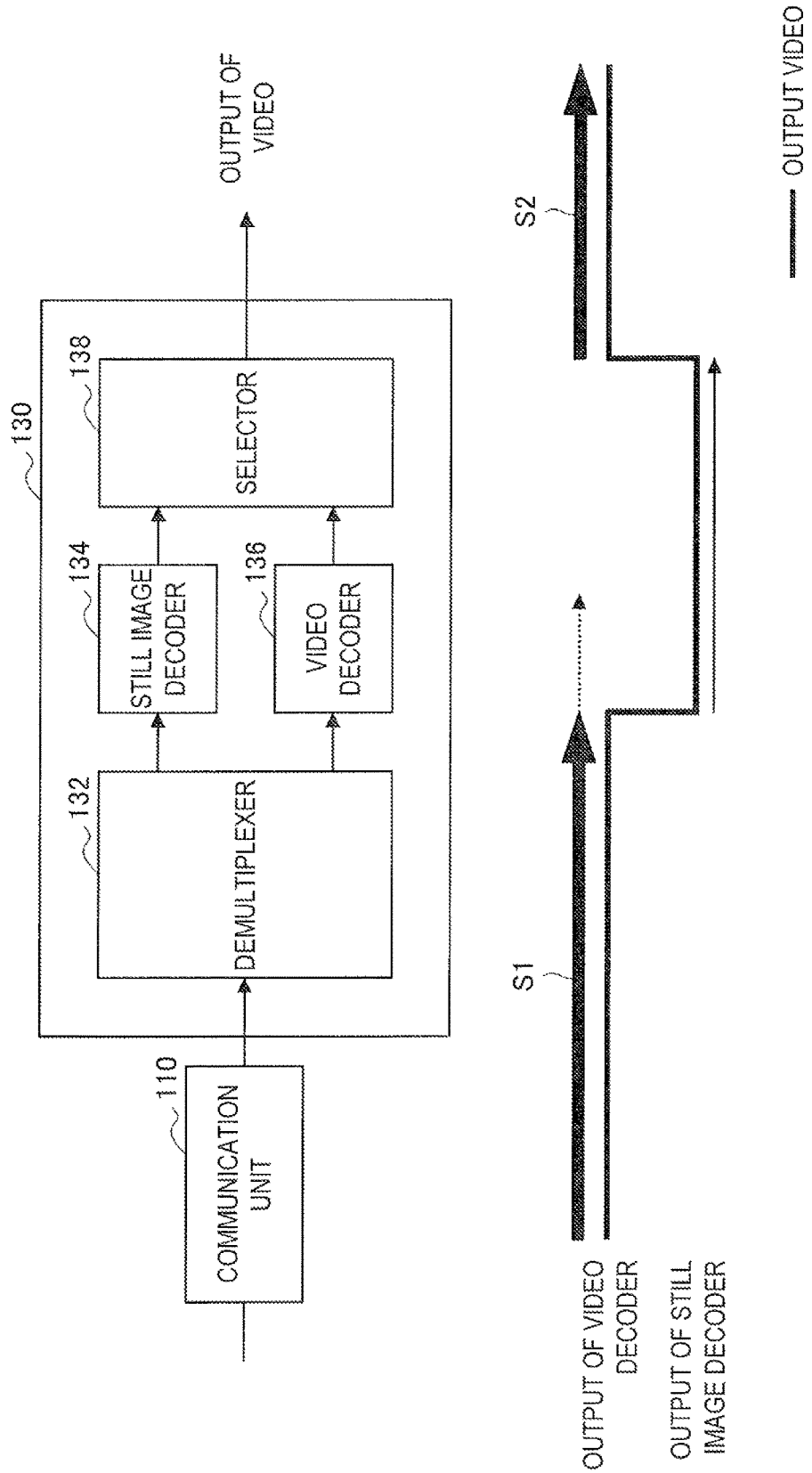
FIG. 23 is a diagram illustrating a method of realizing the bridge screens shown in FIGS. 21 and 22.

FIG. 23 is a diagram illustrating a partial configuration of the content reproduction apparatus 100 configured to realize the third and fourth patterns of the bridge screen display. Here, the constituent elements to which the same reference numerals as those in the configuration of FIG. 4 are given are assumed to have the same functional configurations as those of FIG. 4.

The content reproduction apparatus 100 includes a communication unit 110 and a reproduction processing unit 130. Content data acquired from the content server 400 via the communication unit 110 is reproduced by the reproduction processing unit 130 that operates under the control of the reproduction control unit 126, and thus a video is output.

The reproduction processing unit 130 includes a demultiplexer 132, a still image decoder 134, a video decoder 136, and a selector 138. The demultiplexer 132 is a circuit that demultiplexes one input signal into a plurality of signals in accordance with a control signal. The demultiplexer 132 inputs still image data demultiplexed from the input signal to the still image decoder 134. Further, demultiplexer 132 inputs video data demultiplexed from the input signal to the video decoder 136.

The still image decoder 134 has a function of decoding the input still image data. The video decoder 136 has a function of decoding the input video data. The selector 138 is a circuit that selects one signal from a plurality of input signals and outputs the selected signal. When a reproduced scenario S1, which is a base scenario, transitions to a bridge screen, the selector 138 switches an output video from output data of the video decoder 136 to output data of the still image decoder 134 under the control of the reproduction control unit 126. Then, the selector 138 outputs the output data of the still image decoder as an output video during a setup period in which the reproduction of a scenario S2 is prepared. When the setup of the scenario S2 is completed, the selector 138 switches the output video to the output data of the video decoder 136.

The content reproduction apparatus 100 having such a configuration can switch the output video to one of a still image and a moving image. When a still image to be output is defined in addition to the setup period by the bridge information of the VSI, the still image is displayed even during a setup period of the content data of a moving image to be subsequently reproduced, compared to a case of the related art in which a black image is generally displayed. Therefore, a content with the continuity of a view perspective can be provided.

The first to fourth patterns described above are merely examples. Other patterns based on different screen structures may be defined. The display control unit 122 of the content reproduction system 10 defines the layout of a display screen based on a pattern designated by the VSI.

The bridge may not necessarily include a UI for the options selected by a user's operation. When an immediate bridge is designated, the UI for the options is not displayed and thus a user's operation is not waited for. When a still image is designated as a pattern, a branch scenario displayed automatically through the display of the still image starts to be reproduced. In the immediate bridge, the number of branch scenarios divided from the event of the base scenario is limited to only one. Therefore, the immediate bridge is assumed to be used when a scenario may intent to a branch scenario by performing an Enter operation once at the event.

The constituent elements of the content reproduction system 10 according to the embodiment of the present invention have been described. Next, examples of operations of the content reproduction system 10 will be described.

7. Examples of Operations

Figure 25:
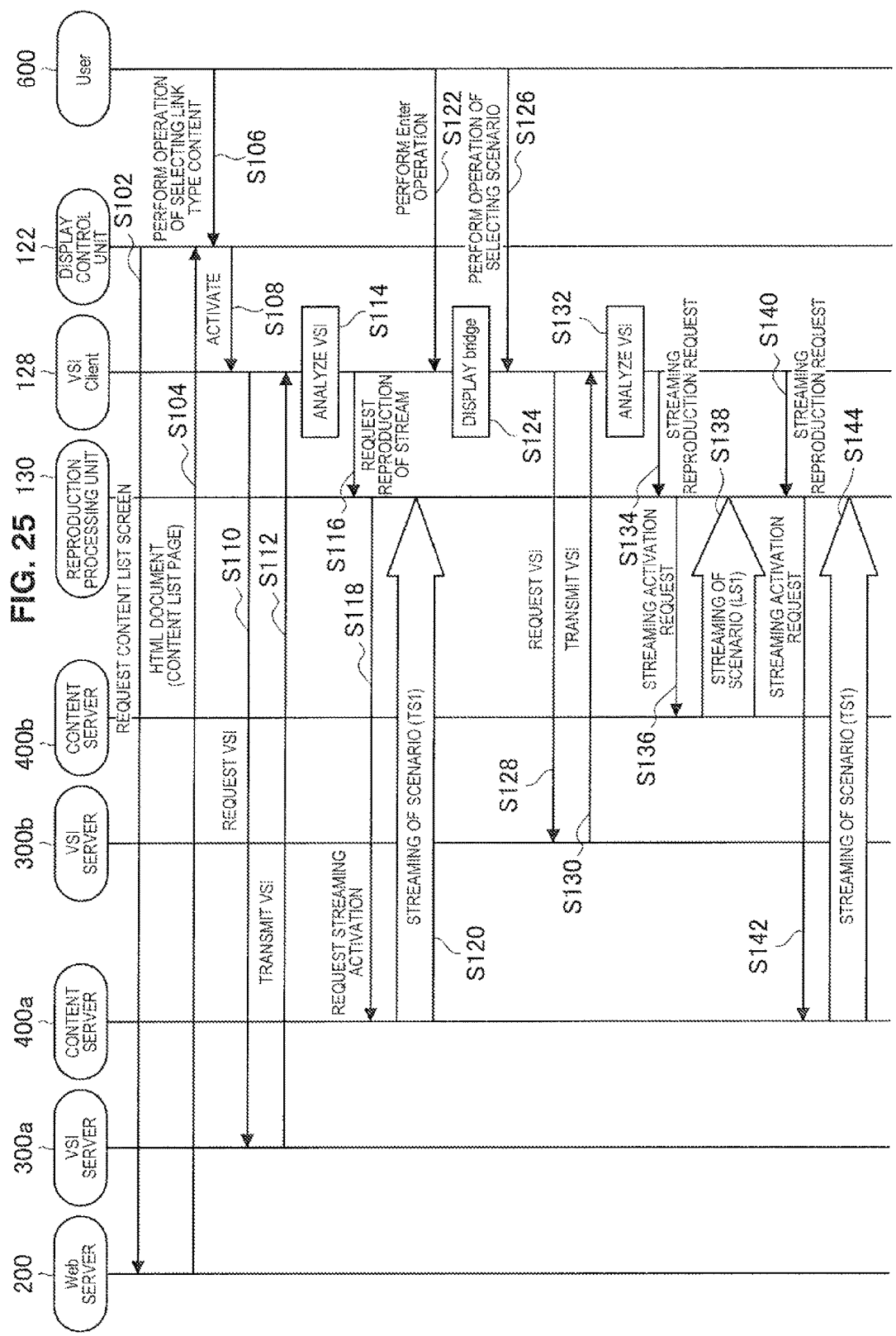
FIG. 25 is a diagram illustrating a sequence of operations in the example of FIG. 24.

FIG. 24 is a diagram illustrating an example of a link-type content. FIG. 25 is a diagram illustrating a sequence of an example of an operation of reproducing the link-type content in FIG. 24.

The link-type content shown in FIG. 24 includes a termination scenario TS1, which is a base scenario, and a loop scenario LS1. The loop scenario LS1 is divided at an event at a given time point of the termination scenario TS1. The termination scenario TS1 and the loop scenario LS1 are provided by different providers. The content data and the VSI of the termination scenario TS1 and the content data and the VSI of the loop scenario LS1 are provided from different VSI servers 300 and content servers 400.

First, the display control unit 122 of the content reproduction apparatus 100 requests a content list screen to the web server 200 (S 102). Then, the web server 200 provides an HTML document including a list of the contents in response to this request from the content reproduction apparatus 100 (S 104). When a user 600 referring the provided content list screen performs an operation of selecting a link-type content from the list of the contents (S 106), the display control unit 122 activates the function of a VSI client 128 (S108). The VSI client 128 is a concept that includes the functions of the control information acquisition unit 124 and the reproduction control unit 126 in FIG. 4.

The VSI client 128 requests the VSI server 300$a$ to transmit the VSI corresponding to the link-type content designated by the user 600 in response to the request from the display control unit 122 (S110). The VSI server 300$a$ requested to transmit the VSI from the VSI client 128 transmits the VSI corresponding to a scenario TS1 to be first reproduced in the link-type content described in the request message (S112). Then, the VSI client 128 having received the VSI analyzes the received VSI (S114). The VSI describes information indicating a location in which the content data of this scenario is stored. The VSI client 128 inputs not only information regarding the storage location of the content data but also a stream reproduction request to the reproduction processing unit 130 (S 116).

The reproduction processing unit 130 requests the content server 400$a$ to perform streaming activation based on the information received from the VSI client 128 (S118). The content server 400$a$ starts streaming delivery of the content data corresponding to the designated scenario S1 in response to the request of the streaming activation (S120). When the user 600 performs an Enter operation during the reproduction of the scenario TS1 in the streaming delivery manner (S 122), the VSI client 128 controls the display of the bridge screen based on the bridge information included in the VSI (S124). Here, an option to transition to a loop scenario LS1, which is a branch scenario, and an option to return to a termination scenario TS1, which is an original base scenario, are displayed on the branch screen.

When the user 600 performs an operation of selecting a branch scenario on the bridge screen (S126), the VSI client 128 requests the VSI server 300$b$ to transmit the VSI corresponding to the loop scenario LS1 which is the branch scenario selected by the user 600 (S128). The VSI server 300$b$ transmits the VSI corresponding to the designated scenario LS1 to the VSI client 128 in response to the request message of the VSI (S130).

The VSI client 128 having received the VSI analyzes the received VSI (S132). Then, the VSI client 128 acquires the storage location of the content data of the loop scenario LS1, which is a branch scenario, from the VSI and inputs not only information regarding the storage location of the content data but also the streaming reproduction request to the reproduction processing unit 130 (S134). At this time, the VSI client 128 retains information regarding a transition time point and the retained VSI regarding the base scenario TS1. The reproduction processing unit 130 transmits a streaming activation request of the loop scenario LS1 to the content server 400$b$ (S136) in response to the reproduction request.

The content server 400$b$ having received the streaming activation request starts the streaming of the designated scenario LS1 (S 138). When the reproduction of the scenario LS1 ends, the VSI client 128 starts reproducing the original base scenario TS1 automatically. Specifically, the VSI client 128 controls the reproduction processing unit 130 such that the reproduction processing unit 130 resumes the reproduction of the base scenario TS1 from the transition time point based on the retained information regarding the transition time point and the retained VSI regarding the base scenario TS1 (S140). In the example of FIG. 25, the VSI client 128 retains the VSI itself regarding the base scenario TS1. Therefore, the VSI client 128 can resume the reproduction of the base scenario TS1 without reacquiring the VSI information, after the reproduction of the loop scenario LS1 which is a branch scenario ends. On the other hand, the VSI client 128 may retain only the information regarding the storage location of the VSI depending on the performance of the content reproduction apparatus 100. In this case, the VSI client 128 can reacquire the VSI based on the retained information regarding the storage location and resume the reproduction of the base scenario TS1.

Under the control of the VSI client 128, the reproduction processing unit 130 requests the content server 400$a$ to perform the streaming activation of the content data from the transition time point of the base scenario TS1 (S142). Then, the content server 400$a$ resumes the streaming delivery of the base scenario TS1 in response to this request (S144).

Figure 26:
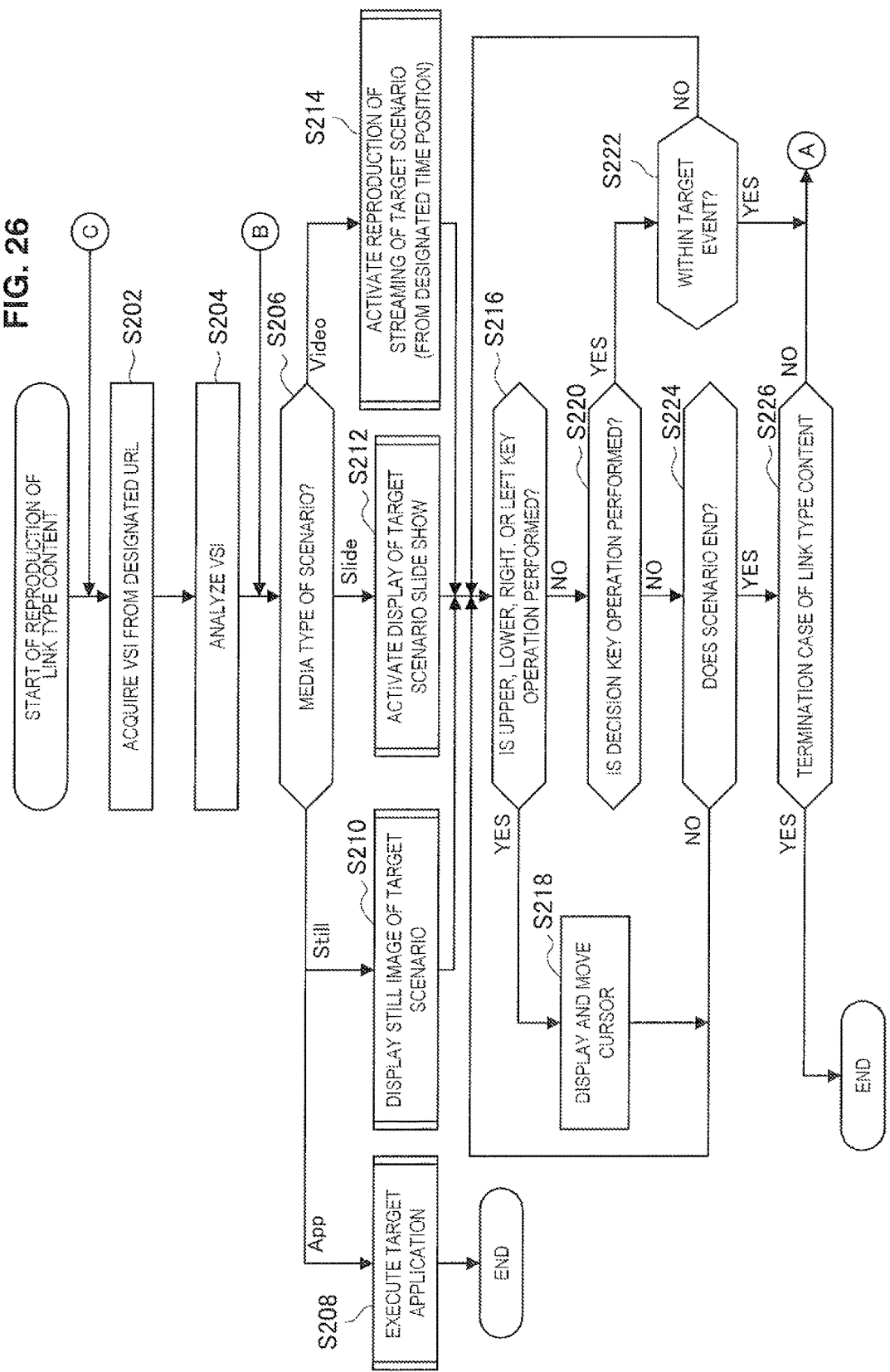
FIG. 26 is a flowchart illustrating an operation of the content reproduction apparatus.
Figure 27:
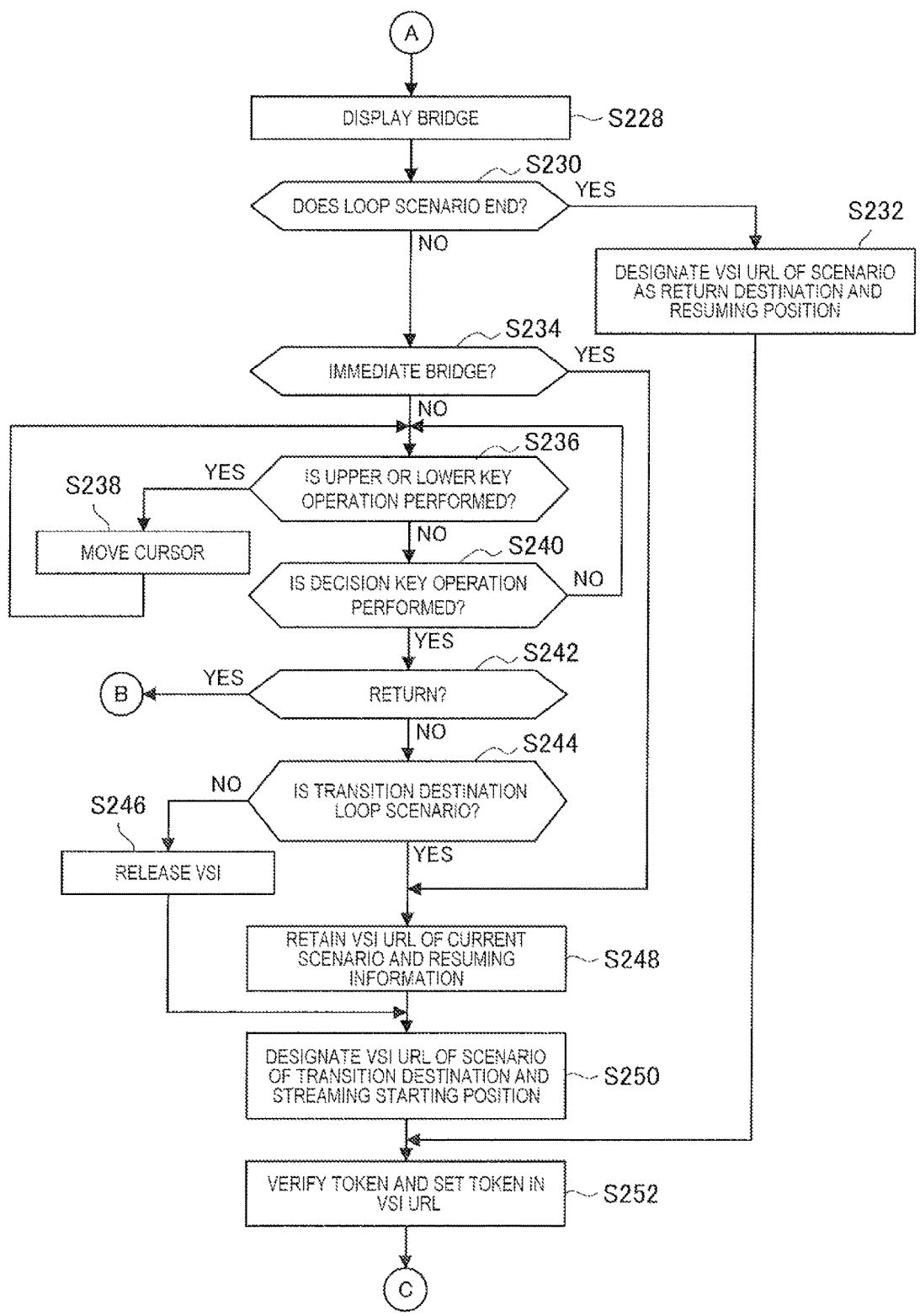
FIG. 27 is a flowchart illustrating the operation of the content reproduction apparatus.

The operation of the content reproduction system 10 in the example of the link-type content shown in FIG. 24 has been described. Next, an operation of the content reproduction apparatus 100 will be described with reference to FIGS. 26 and 27. FIGS. 26 and 27 are flowcharts illustrating the operation of the content reproduction apparatus.

When the reproduction of the link-type content is started by a user's operation, the operation of the flowchart starts. When the VSI client 128 of the content reproduction apparatus 100 receives an instruction to reproduce a link-type content, the VSI client 128 acquires the VSI from a designated URL (S202). Then, the VSI client 128 analyzes the VSI acquired by the VSI client 128 (S204).

In the VSI, a media type of the scenario is described. Therefore, the VSI client 128 determines the media type of the scenario based on the VSI (S206). Here, the media types of the scenarios are four types, that is, an application (App), a still image (Still), a slide show (Slide), and a moving image (Video).

When the VSI client 128 determines that the media type of the scenario is the application in step S206, the VSI client 128 executes a target application (S208). When the media type of the scenario is an application, the execution of the application ends due to the fact that the kind of scenario is defined as the termination scenario, and thus the reproduction of the link-type content ends.

When the VSI client 128 determines that the media type of the scenario is a still image in step S206, the VSI client 128 displays a still image of the target scenario (S210). When the VSI client 128 determines that the media type of the scenario is a slide show in step S206, the VSI client 128 activates display of the target slide show (S212). When the VSI client 128 determines that the media type of the scenario is the slide show in step S206, the VSI client 128 activates the reproduction of streaming of the target scenario (S214). At this time, the VSI client 128 starts the reproduction of the streaming from a designated time position depending on a situation.

When the reproduction of the still image, the slide show, and the moving image starts in step S210, step S212, and step S214, respectively, the VSI client 128 subsequently determines whether the user 600 performs an upper, lower, right, or left key operation using an input device (S216). When the VSI client 128 determines that the user 600 performs the upper, lower, right, or left key operation in step S216, the display control unit 122 displays a cursor and moves the position of the cursor in response to the key operation (S218). After the operation of step S218, the operation returns to step S216 to make the determination.

When the VSI client 128 determines that the user 600 performs the upper, lower, right, or left key operation in step S216, the VSI client 128 subsequently determines whether a decision key operation is performed (S220). When the VSI client 128 determines that the user 600 performs the decision key operation in step S220, it is determined whether the decision key operation is performed within a target event (S222). When it is determined in step S222 that the decision key operation is not performed within the target event, the operation returns to step S216 to make the determination. Conversely, when it is determined in step S222 that the decision key operation is performed within the target event, the operation proceeds to step S228 of FIG. 27.

Conversely, when the VSI client 128 determines that the user 600 does not perform the decision key operation in step S220, the VSI client 128 subsequently determines whether the scenario ends (S224). When the VSI client 128 determines that the scenario does not end in step S224, the operation returns to step S216 to make the determination. That is, the determinations of step S216 to step S224 are repeated until the decision key operation is performed within the target event or the reproduction of the scenario ends.

Conversely, when the VSI client 128 determines that the scenario ends in step S224, the VSI client 128 subsequently determines whether the link-type content is a termination case of the link-type content (S226). That is, the termination case of the link-type content refers to a case in which a reproduced scenario is a termination scenario.

When the VSI client 128 determines that the link-type content is the termination case of the link-type content in step S226, the reproduction of the link-type content ends. Conversely, when the VSI client 128 determines that the link-type content is the termination case of the link-type content in step S226, the operation proceeds to step S228.

In step S228, the VSI client 128 displays a bridge. Here, the VSI client 128 determines whether the scenario reproduced up to the current time point is a loop scenario and the production of the loop scenario ends (S230). When the VSI client 128 determines that the reproduction of the loop scenario ends in step S230, the VSI client 128 designates a VSI URL of a scenario of a return destination and a resuming position (that is, a transition time point) (S232) and the operation proceeds to step S252. Conversely, when the VSI client 128 determines that the reproduction of the loop scenario does not end in step S230, the VSI client 128 subsequently determines whether the bridge displayed in step S228 is an immediate bridge (S234). This determination is made based on bridge information of the bridge displayed in step S228.

When the VSI client 128 determines that the bridge displayed in step S228 is the immediate bridge in step S234, the operation proceeds to step S248. Conversely, when the VSI client 128 determines that the bridge displayed in step S228 is not the immediate bridge in step S234, the VSI client 128 subsequently determines whether the user performs the upper or lower key operation using the input device (S236).

When the VSI client 128 determines that the user performs the upper or lower key operation in step S236, the display control unit 122 moves the cursor in response to the upper or lower key operation (S238). Conversely, when the VSI client 128 determines that the user does not perform the upper or lower key operation in step S236, the VSI client 128 subsequently determines whether the user performs the decision key operation (S240).

When the VSI client 128 determines that the user does not perform the decision key operation in step S240, the operation returns to step S236. Conversely, when the VSI client 128 determines that the user performs the decision key operation in step S240, the VSI client 128 subsequently determines whether a selected option is an option to return to the original scenario (S242).

When the VSI client 128 determines that the selected option is the option to return to the original scenario in step S242, the operation returns to step S206 of FIG. 26 to make the determination. Conversely, when the VSI client 128 determines that the selected option is not the option to return to the original scenario in step S242, the VSI client 128 subsequently determines whether the scenario of a transition destination is a loop scenario (S244).

When the VSI client 128 determines that the scenario of the transition destination is not the loop scenario in step S244, the VSI client 128 releases the VSI (S246). Conversely, when the VSI client 128 determines that the scenario of the transition destination is the loop scenario in step S244, the VSI client 128 retains the VSI URL of the currently reproduced scenario and resuming information (S248).

Then, the VSI client 128 designates the VSI URL of the scenario of the transition destination and a streaming starting position, verifies a token, and sets the token in the VSI URL (S252). After step S252, the operation proceeds to step S202.

The operation of the content reproduction system 10 according to the embodiment has been described. In the operation of the content reproduction system 10, an authentication token described partially in step S252 of FIG. 27 will be described in detail below.

8. Takeover of Authentication Token

In the content reproduction system 10 according to the embodiment, authentication information of a user can be taken over between scenarios provided by different providers by including an authentication token in the VSI and taking over the authentication token between the scenarios.

The takeover of the authentication token will be described with reference to FIGS. 28 and 29. Here, the VSI and the content data of each scenario are provided from a VSI content server 350a of Provider A that supplies both the VSI and the content data and a VSI content server 350b of Provider B that supplies both the VSI and the content data.

First, the web server 200 provides an HTML document of a list of contents to the display control unit 122 of the content reproduction apparatus 100 (S302). At this time, the web server 200 transmits not only the HTML document but also a token used to identify a user. Further, the user 600 is assumed to perform a log-in operation on the web site provided by the web server 200.

When the user 600 performs an operation of selecting a link-type content with reference to the provided list of the contents (S304), the display control unit 122 activates the function of the VSI client 128 to reproduce the link-type content (S306).

Then, the VSI client 128 transmits not only the token but also a request to acquire the VSI to the VSI content server 350a (S308). The VSI content server 350a transmits the VSI in response to the request to acquire the VSI (S310). At this time, the VSI content server 350a includes a common token as common user authentication information used commonly in the link-type content in the VSI, and then transmits this VSI.

Figure 28:
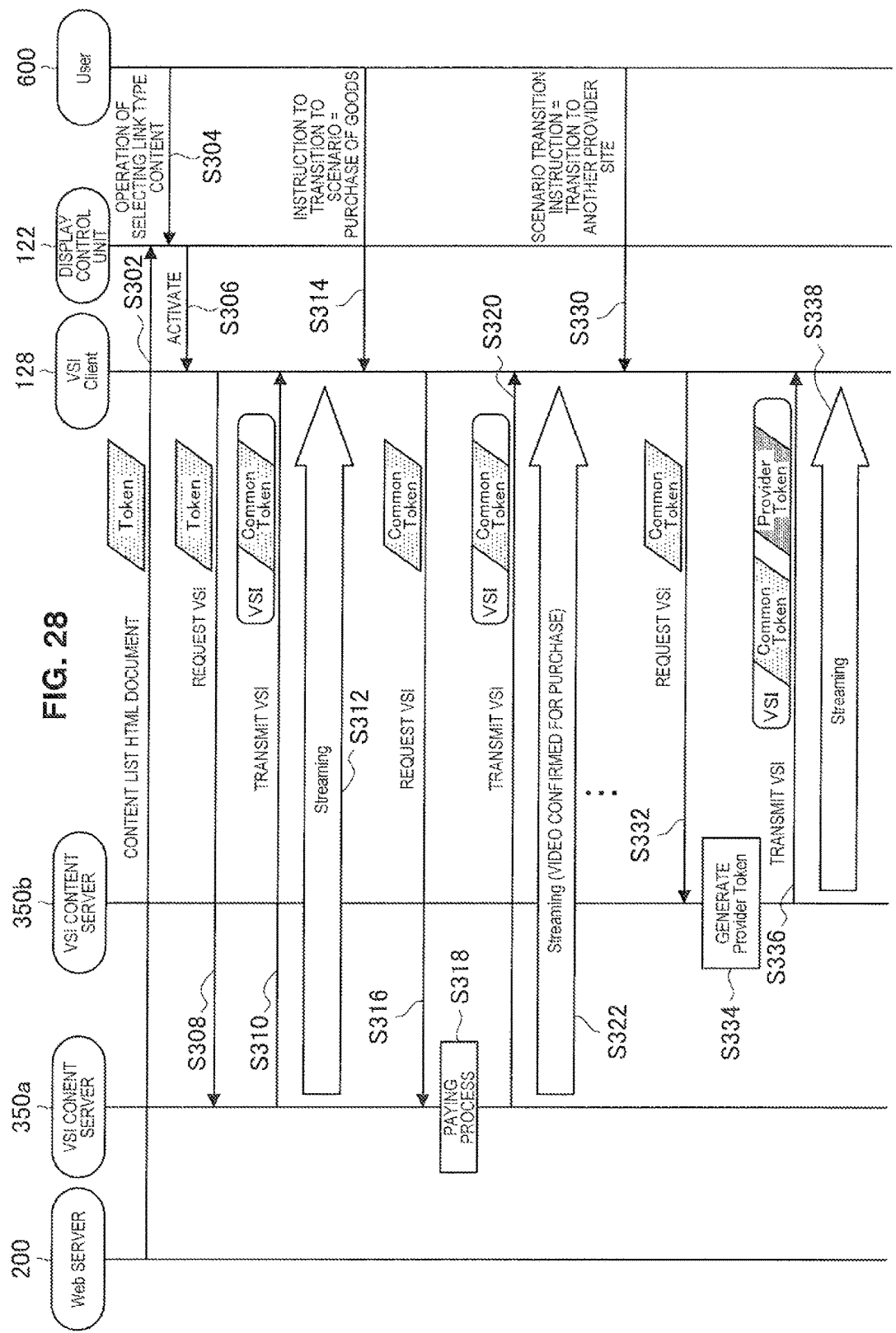
FIG. 28 is a diagram illustrating a sequence of operations when an authentication token is used.
Figure 29:
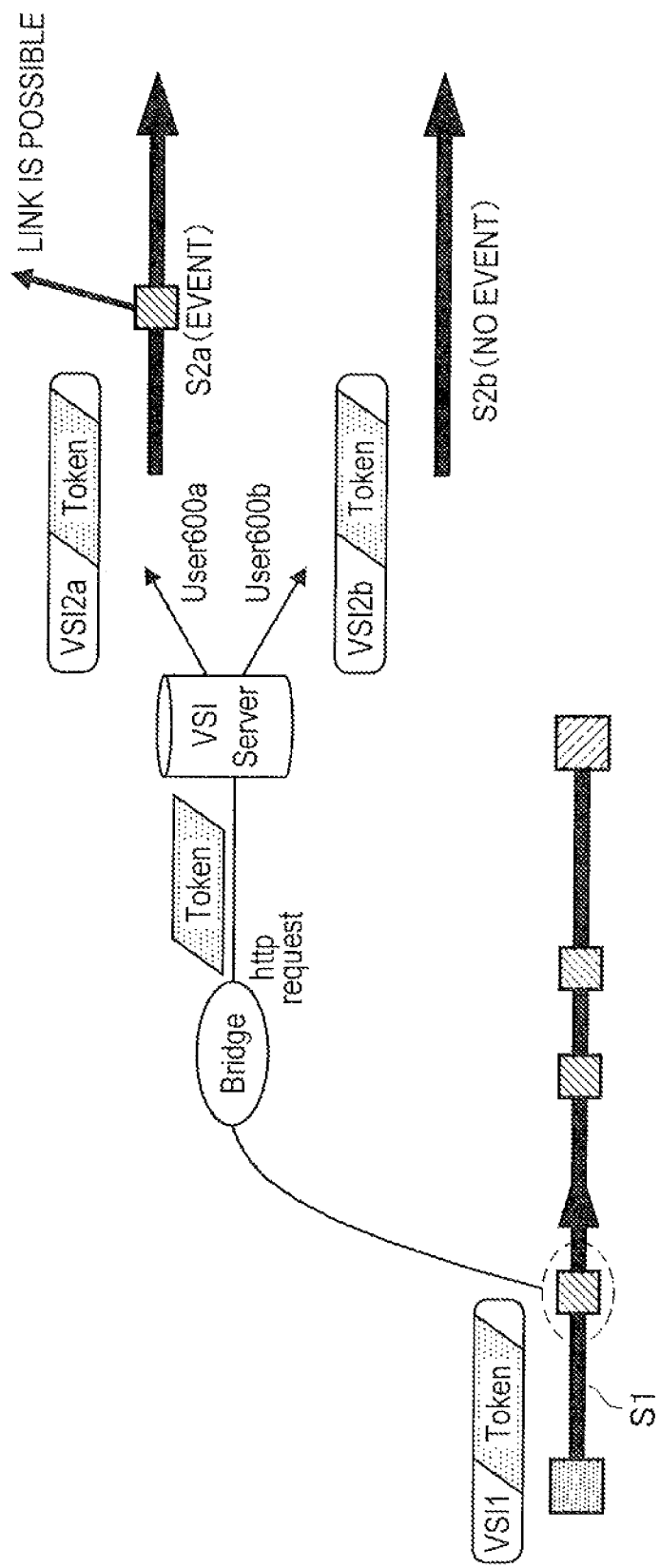
FIG. 29 is a diagram illustrating an example of a content realizable by the takeover of the authentication token.

Although not illustrated in FIG. 28, the VSI client 128 may transmit a streaming activation request to the VSI content server 350a after performing step S310. In response to the activation request, the VSI content server 350a starts reproducing the streaming of the content data of the designated scenario (S312). When the user 600 gives an instruction to transition to a scenario associated with purchase of goods during the reproduction of the content data of the scenario (S314), the VSI client 128 determines whether the transition instruction is given within the range of an event and gives a request to acquire the VSI in response to the instruction (S316). At this time, the VSI client 128 includes the common token in a VSI acquisition request message and transmits the VSI acquisition request message.

The VSI content server 350a performs a paying process based on an input of the user 600 (S318), includes the received common token in the VSI, and transmits the VSI (S320). When the VSI client 128 performs a streaming activation request based on the received VSI, the VSI content server 350a starts streaming delivery of the content data of a video confirmed for purchase (S322).

When the user 600 inputs a scenario transition instruction to transition to another provider site (S330), the VSI client 128 transmits a VSI request message to the VSI content server 350b which is a server of another provider site (S332). At this time, the VSI client 128 includes the common token in the VSI request message and transmits the VSI request message.

Here, when Provider B uses the common token and a provider token which is user authentication information of each provider unique to other providers, the VSI content server 350b generates the provider token (S334), includes both the common token and the provider token in the VSI, and transmits the VSI to the content reproduction apparatus 100 (S336). Then, the VSI content server 350b starts the streaming delivery of the content data of a designated scenario in response to the request of the VSI client 128 (S338).

As described above, the content reproduction system 10 according to the embodiment includes the common token used commonly between a plurality of scenarios of the link-type content and the provider token unique to each provider providing the scenarios and the VSI in the VSI, the request message, or the like and transmits the VSI, the request message, or the like. Therefore, since the token is taken over between the scenarios, the user authentication is facilitated.

The provider token unique to each provider is not taken over and is destroyed when a scenario transitions to a scenario provided by a provider with a different domain. The common token is taken over even between the scenarios provided by different providers.

By taking over the token, the users can be identified without a separate log-in operation or the like. Therefore, for example, when the token is taken over from a given scenario S1 to a scenario S2, as in FIG. 29, the VSI server can distinguish the users from each other based on the token information. Therefore, for example, the VSI server can provide different scenarios in accordance with the attributes of the users. For example, when a user 600a is a charged user and a user 600b is a charge-free user, a scenario S2a including an event can be provided to the user 600a and a scenario S2b including no event can be provided to the user 600b.

9. Example of Detailed Specifications of Control Information

The detailed specifications of the VSI which is control information are shown in FIGS. 30 to 33. FIG. 30 is a table illustrating all of the specifications of the VSI.

The VSI is generated for each scenario. The VSI mainly includes metadata regarding a scenario, event information regarding a division event included in a scenario, and token information.

The metadata regarding a scenario includes information used to specify a scenario, information used to identify a provider providing a scenario, information used to specify the content data of a scenario, and information regarding the media types of scenarios. When the information regarding the media type of scenarios is provided, the content reproduction apparatus can cope with a plurality of media types of scenarios by controlling the reproduction with reference to the information regarding the media types of scenarios.

The event information included in a scenario is defined by the specifications shown in FIG. 31. The event information includes metadata regarding an event, bridge information used in an event, and branch information regarding a branch scenario which can transition from the event.

The detailed specifications of the bridge information included in the event information are shown in FIG. 32. The bridge information is information that defines a user interface when an event is activated. Therefore, the bridge information includes information necessary to display a bridge screen.

The detailed specifications of the branch information included in the event information are shown in FIG. 33. The event information includes a single or plurality of branch information. Information regarding a font size, a font type, a font color, and the like of each branch on the bridge screen is included in the bridge information in the embodiment, but the present invention is not limited thereto. For example, the information regarding the font size, the font type, the font color, and the like of each branch on the bridge screen may be included in each branch information.

The functions of the content reproduction system 10 and the detailed specifications of the link-type content according to the embodiment of the present invention have been described. In the content reproduction system 10, one content can be produced in a scenario unit by a plurality of providers. Therefore, new contents which have not been produced can be provided. Next, an example of the link-type content provided by applying the content reproduction system according to the embodiment of the present invention will be described.

10. Examples of Application Services

FIG. 34 is a diagram illustrating an example of a multi-scenario drama which can be provided by the content reproduction system according to the embodiment of the present invention.

In the link-type content according to the present invention, different scenarios can be reproduced in response to an input operation of a user. Therefore, at an event of a scenario S1, it is possible to provide a multi-scenario drama in which an end is different depending on which scenario is selected.

FIG. 35 is a diagram illustrating an example of an experience-based tour information program provided by the content reproduction system according to the embodiment of the present invention.

In the link-type content, a program in which the details are different in accordance with selection of a user can be provided by reproducing a scenario selected in response to an input operation of the user. For example, information regarding a tour obtained by the user is different at the first event in response to the selection of the user. The user selecting a loop scenario LS1 moves to a destination by bus. Then, the user selecting a loop scenario LS2 moves to a destination by the Shinkansen.

FIG. 36 is a diagram illustrating an example of a still image spatial portal provided by the content reproduction system according to the embodiment of the present invention.

For example, a map of the earth is displayed on a still image of a still image main scenario 362. The still image main scenario 362 has a plurality of spatial events. When a user selects a location on the map, an event corresponding to the selected location is activated and the scenario transitions to another scenario. For example, when the location of Japan is selected during the reproduction of the still image main scenario 362, the still image main scenario 362 transitions to a still image branch scenario 364 which is a branch scenario of the still image main scenario 362. The still image branch scenario 364 has a plurality of spatial events. Therefore, when the user selects a location (here, Tokyo) again on the map of the still image branch scenario 364, an event corresponding to the selected location is activated. Here, a bridge screen 368 having a list of a plurality of scenarios regarding Tokyo is displayed. When the user selects one scenario on the bridge screen 368, the reproduction of the selected scenario starts. For example, the provided scenario may be a moving image branch scenario 369.

FIG. 37 is a diagram illustrating an example of a moving image content which can be provided by the content reproduction system according to the embodiment of the present invention.

In this example, by using a loop scenario from the event of a termination scenario TS1 which is a base scenario, it is possible to provide a content in which a loop scenario LS1 which is a CM image associated with the base scenario TS1 and a loop scenario LS2 which is a moving image content associated with the base scenario TS1 are inserted.

At this time, when the loop scenarios LS1 and LS2 according to auto events are inserted, a provider can configure the moving image content such that a user viewing the base scenario TS1 necessarily views the associated CM and the associated moving image content. Here, when the configuration in which the above-described token is taken over is used, the content reproduction apparatus 100 can perform control such that the loop scenarios LS1 and LS2 are not reproduced to a charged user.

Figure 38:
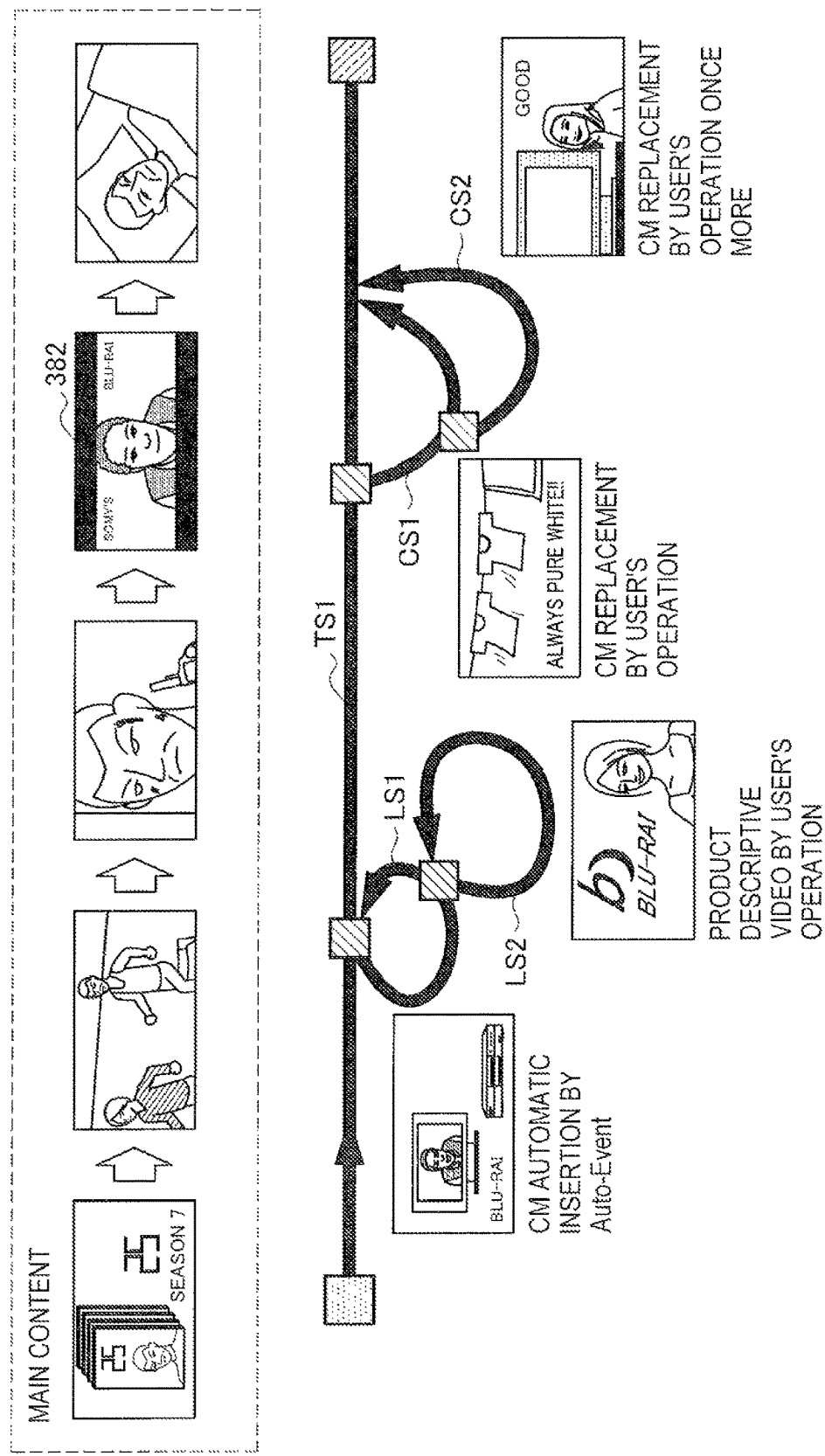
FIG. 38 is a diagram illustrating an example in which a CM content is inserted and replaced by applying the content reproduction system according to the embodiment.

FIG. 38 is a diagram illustrating an example of a moving image content which can be provided by the content reproduction system according to the embodiment of the present invention.

By using the configuration of the link-type content, the CM moving image content which can transition by a user's operation can be inserted into the scenario TS1 which is the main content. At this time, for example, when the user performs a transition operation once more during the reproduction of the loop scenario LS1, the user can view a detailed description video of a product introduced by the CM provided in the loop scenario LS1. The content can be realized by inserting the CM moving image in the loop scenario LS1, setting the loop scenario LS2 which can transition during the reproduction of the loop scenario LS1, and setting a product description video as the loop scenario LS2.

Alternatively, a CM can be replaced by setting an event in a CM image 382 in the scenario TS1 which is the main content. The content can be realized by setting an event in the CM image 382 and setting another CM moving image scenario by a connect scenario. A CM can be replaced by setting the connect scenario to transition at the time point when the CM ends, when the reproduction of the connect scenario ends.

Figure 39:
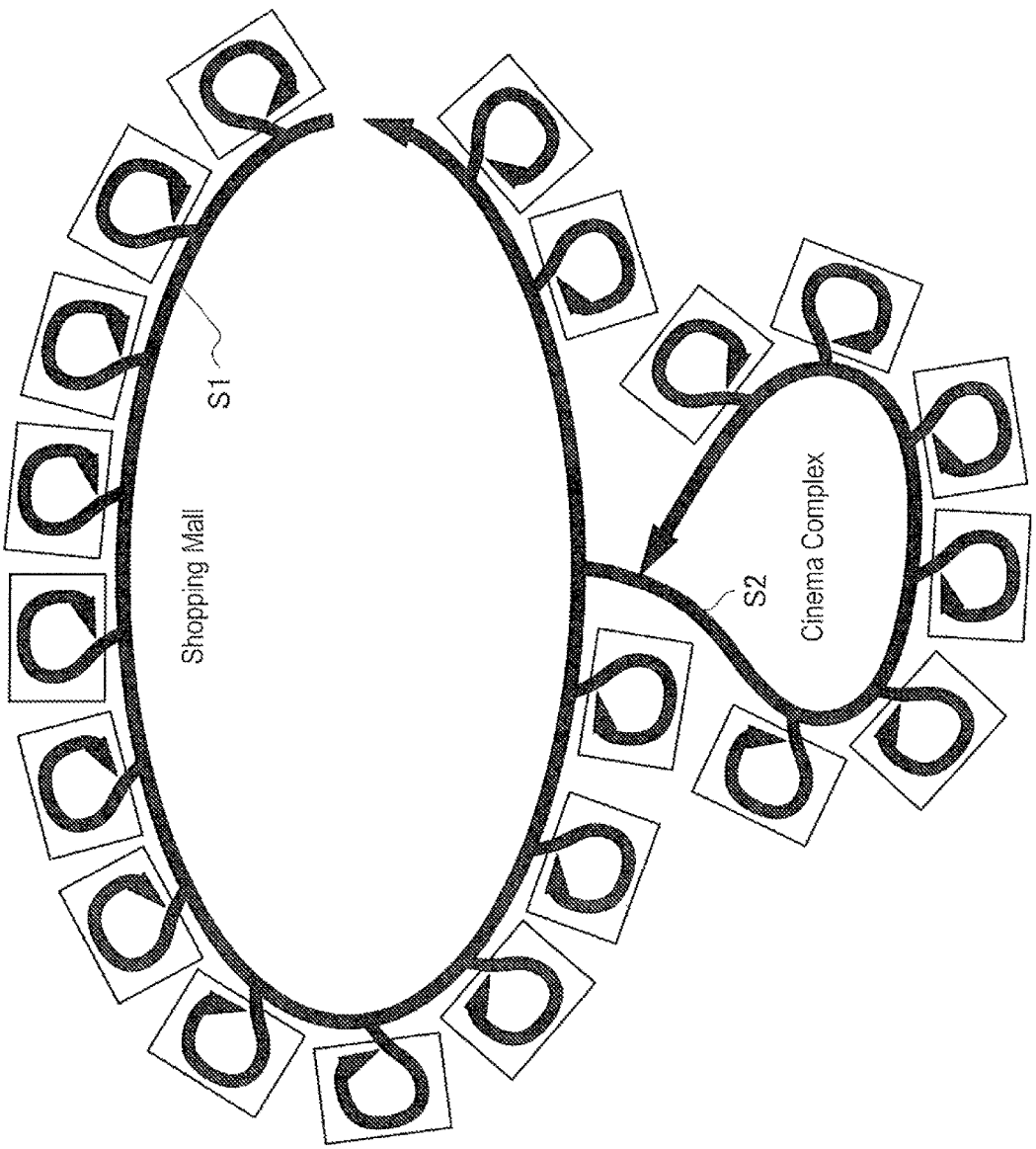
FIG. 39 is a diagram illustrating an example of a virtual space realized by applying the content reproduction system according to the embodiment.

FIG. 39 is a diagram illustrating an example of a virtual space realized by applying the content reproduction system according to this embodiment.

For example, a scenario S1 which is the main scenario of the virtual space is created by a moving image content for a shopping mall. A plurality of shop scenarios are provided as the branch scenarios of the scenario S1. Further, a cinema scenario S2 which is a virtual movie theater may be provided as a branch scenario of the scenario S1. In the cinema scenario S2, as shown in FIG. 40, an entrance, a lobby at which a preview video or the like of each movie can be viewed, a ticket booth at which a movie ticket is bought, and a theater at which a movie can be viewed are prepared. FIG. 40 is a diagram illustrating an example of a user experience realized by a virtual space shown in FIG. 39.

Figure 41:
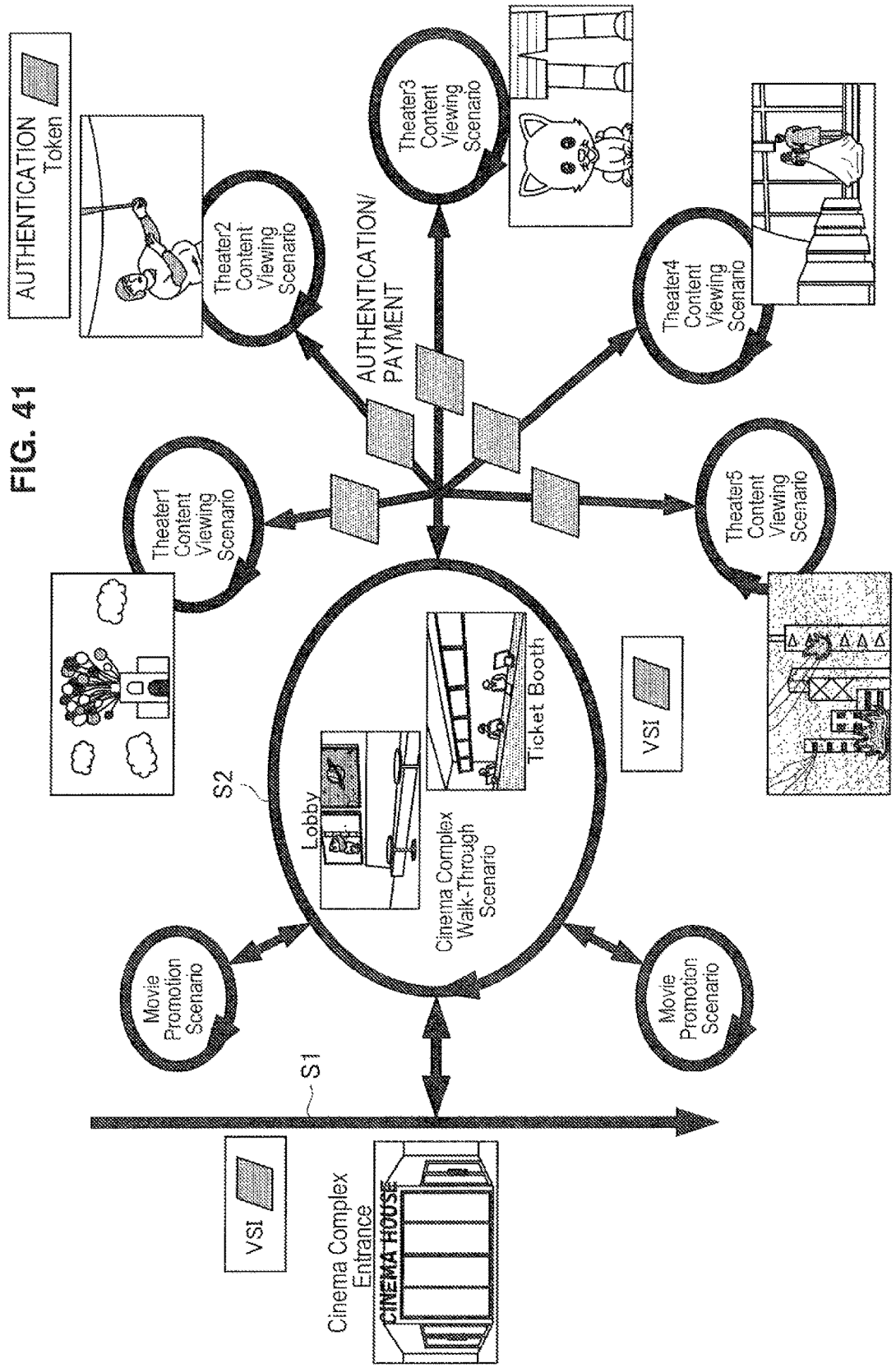
FIG. 41 is a diagram illustrating a scenario configuration of a cinema part of the virtual space shown in FIG. 39.

The cinema complex can be realized by, for example, a scenario configuration shown in FIG. 41. For example, when an event corresponding to the entrance of the cinema complex is activated in a scenario S1 which is the main scenario of the virtual space, the scenario S1 transitions to a cinema complex walk-through scenario S2. The cinema complex walk-through scenario S2 has an event for transitioning to a branch scenario which is a moving image scenario of a preview of a movie and an event for transitioning to a ticket booth.

At this time, a token is included in the VSI and is taken over between the scenarios. Therefore, a user can perform a charging procedure for buying a ticket to view a movie using the taken-over token without a complicated procedure.

Figure 42:
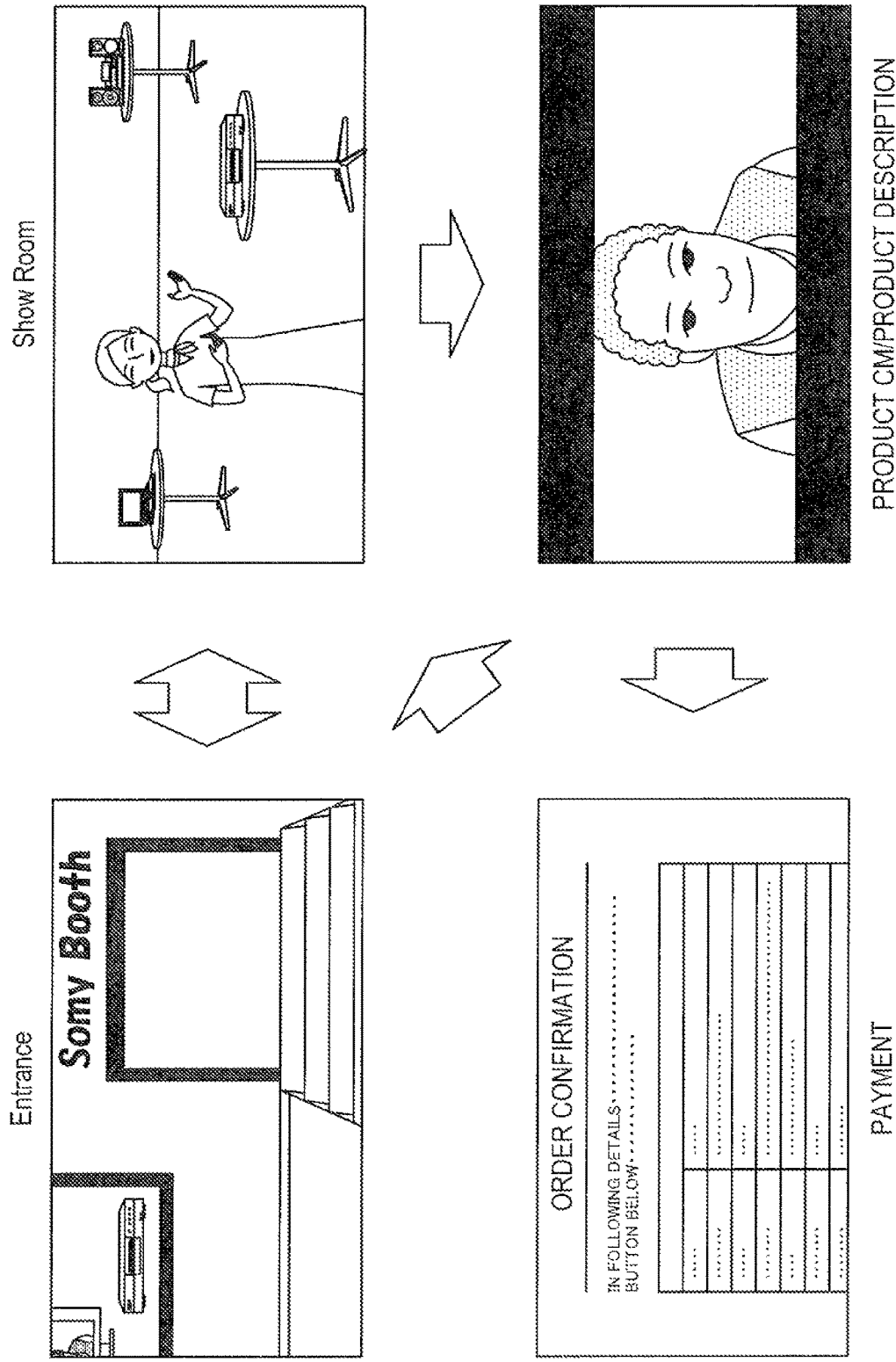
FIG. 42 is a diagram illustrating another example of the user experience realized by the virtual space shown in FIG. 39.

FIG. 42 is a diagram illustrating an example of a user experience when the cinema complex walk-through scenario transitions to a scenario of each shop. When the user enters the entrance of a given shop, the user can view a show room at which a plurality of products are exhibited. At the show room, the user can transition to the product CM scenario of each product or a description moving image scenario that describes the product in detail. Alternatively, the description of the products may be provided by a still image scenario that describes the specifications of the products. Further, the user can actually buy a product exhibited at the show room.

Figure 43:
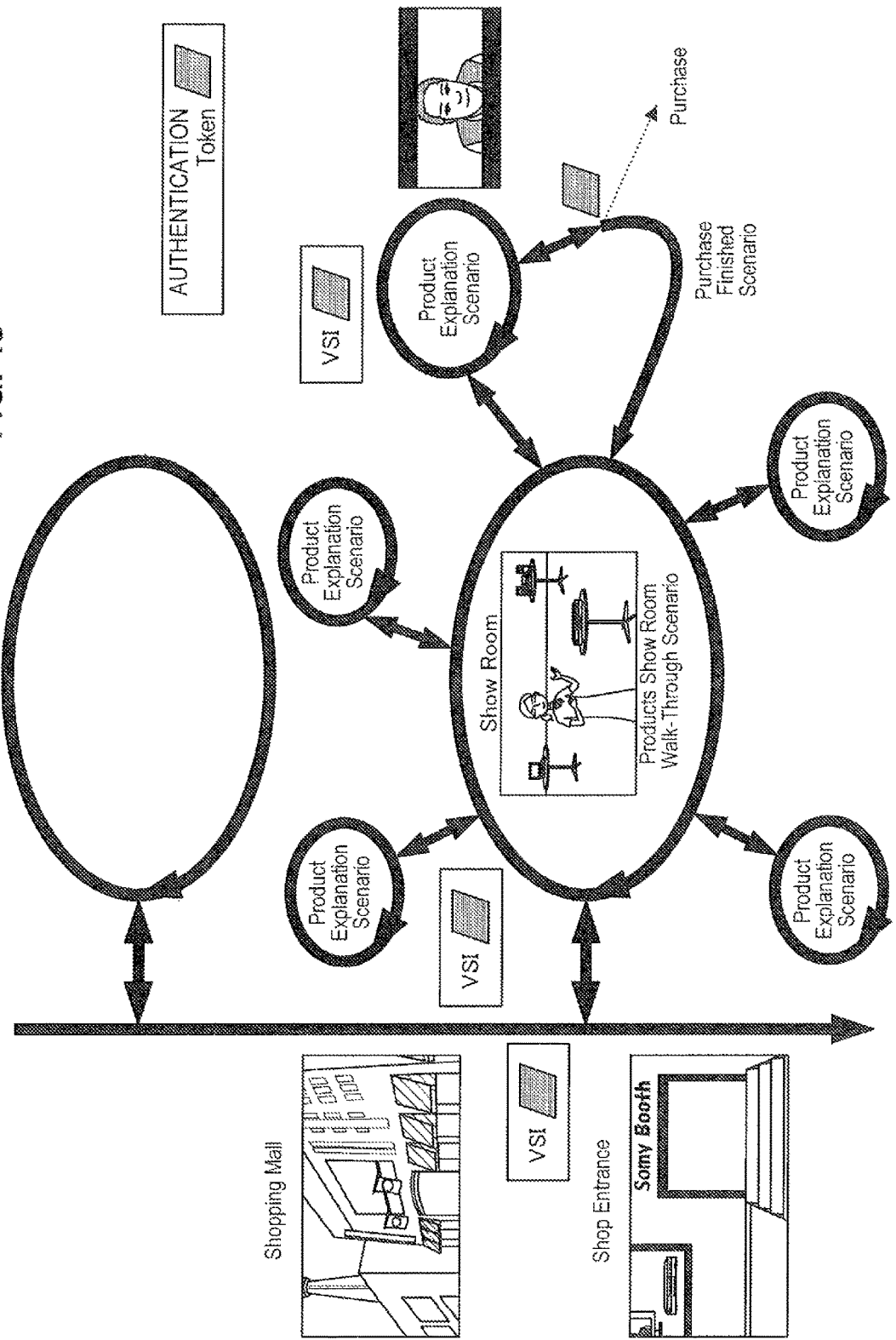
FIG. 43 is a diagram illustrating a scenario configuration of one shop of the virtual space shown in FIG. 39.

The user experience can be realized by a scenario configuration shown in FIG. 43. When the user enters a given shop from the entrance of the shopping mall scenario, a scenario can transition to a scenario for viewing a show room. This scenario can transition to a CM scenario of each product or a product description scenario. Further, a user can actually buy the product from the product description scenario. Even in this case, since user authentication information can be taken over between the scenarios by including a token in the VSI, a charging process can be facilitated.

11. Examples of Advantages

The configuration of the content reproduction system and the specifications of the link-type content according to the embodiment have been described. By applying the content reproduction system, it is possible to include a plurality of scenarios including the content data and the VSI which is metadata used to control the reproduction of the content data and provide the link-type content in which the scenarios are linked.

In the link content, the content data of each scenario and the VSI describing the information used to control the reproduction of the content data are separately configured. Therefore, the scenarios can be linked based on the event information described in the VSI. In the link-type content, new content data can be inserted by editing the VSI and adding the event information used to transition to another scenario to the VSI halfway through the content data without editing the original content data.

Therefore, one link-type content can be created by a plurality of providers. By unifying the specifications of the VSI, different providers can easily create each scenario by apportioning one content.

Since the VSI client takes over the token used to authenticate a user, the user may not perform a log-in operation when a scenario transitions to another scenario between different scenarios and the content reproduction apparatus, the VSI server, and the content server can identify the user. When provider tokens are used by a plurality of providers and a scenario transitions to a scenario of another provider, the provider token is not delivered and only the common token is delivered. The common token may be delivered even between the scenarios of different providers within the same link-type content.

The preferred embodiment of the present invention has been described in detail with reference to the accompanying drawings, but embodiments of the present invention are limited thereto. It should be apparent to those skilled in the art that various modifications and corrections are made without the technical scope described in claims and the modifications and the corrections, of course, pertain to the technical scope of the embodiment of the present invention.

For example, in the above-described embodiment, the case in which the content data is one of the moving image content, the still image content, the slide show content, and the application content has been described, but the embodiment of the present invention is not limited thereto. For example, an audio content such as music, a lecture, and a radio program may be included.

In the specification, the steps described in the flowcharts include not only processes that are chronologically performed in the described order but also processes that are not necessarily performed chronologically but are performed in parallel or individually. The processing order of the steps that are chronologically performed may, of course, be changed.

REFERENCE SIGNS LIST 100 content reproduction apparatus
110 communication unit
120 control unit
122 display control unit
124 control information acquisition unit
126 reproduction control unit
128 VSI client
130 reproduction processing unit
200 web server
300 VSI server
400 content server
350 VSI content server

The invention claimed is:

1. A content reproduction apparatus comprising:
a memory device having stored thereon a program; and
a processing device which upon executing the program obtained from the memory device operates as
a reproduction control unit configured to control reproduction of a link-type content including a plurality of scenarios that each include content data and control information regarding reproduction of the content data; and
a control information acquisition unit configured to (i) add both common user authentication information commonly used in the scenarios of the content and user authentication information of a respective provider that provides the respective scenario which is unique to each said provider, to an acquisition request message used to acquire the control information, (ii) transmit the acquisition request message, and (iii) acquire the control information,
wherein the reproduction control unit is configured to control the reproduction of the link-type content by reproducing the content data in accordance with the control information including event information used to transition from a current scenario to another scenario, and
wherein the control information acquisition unit is configured to take over the common user authentication information of a user between ones of the scenarios involving different providers without a log-in operation being performed therebetween, such that when transitioning from a first scenario involving a first provider to a second scenario involving a second provider different from the first provider the control information acquisition unit is configured to take over the common user authentication information of the user so as to enable identification of the user without performing the log-in operation,
wherein the common user authentication information comprises a common token that is included in the control information provided by one of the providers, wherein the user authentication information of the respective provider comprises a provider token that is included in the control information provided by one of the providers, and wherein the provider token is not taken over when transitioning from a first scenario involving a first provider with a first domain to a second scenario involving a second provider with a second domain different from the first domain.

2. The content reproduction apparatus according to claim 1,
wherein the event information of the control information includes information used to acquire control information of a scenario of a transition destination, and
wherein the reproduction control unit controls the transition of the scenario by reproducing content data of the scenario of the transition destination in accordance with the control information of the scenario of the transition destination.

3. The content reproduction apparatus according to claim 2, wherein, when the control information acquisition unit determines that the current scenario and another scenario are provided by a same provider, the control information acquisition unit is configured to add the user authentication information of each provider based on the control information to the acquisition request message used to acquire the control information of the another scenario.

4. The content reproduction apparatus according to claim 2,
wherein the event information includes bridge information that defines a user interface when the current scenario transitions to another scenario, and
wherein the reproduction control unit is configured to display a bridge screen configured to transition to the another scenario based on the bridge information.

5. The content reproduction apparatus according to claim 4,
wherein the event information includes information indicating a range in which the current scenario transitions to another scenario, and
wherein the reproduction control unit is configured to display the bridge screen when a user performs an operation of activating the event within the range.

6. The content reproduction apparatus according to claim 2, in which the processing device upon executing the program obtained from the memory device further operates as:
a reproduction processing unit configured to perform a production process under control of the reproduction control unit,
wherein the bridge information includes information of a still image to be displayed during a setup period of the another scenario, and
wherein the reproduction processing unit includes a still image reproduction unit configured to reproduce the still image, a moving image reproduction unit configured to reproduce a moving image, and a selector configured to switch between an output image of the still image reproduction unit and an output image of the moving image reproduction unit.

7. The content reproduction apparatus according to claim 6,
wherein the control information includes media-type information of the content data, and
wherein the reproduction control unit is configured to perform control such that the reproduction processing unit performs a process of reproducing the content data in accordance with the media-type information.

8. The content reproduction apparatus according to claim 7, wherein, when a media-type of the content data is a moving image, the control information includes information regarding at least one of two-dimensional video content data and three-dimensional video content data.

9. The content reproduction apparatus according to claim 2, wherein, when the scenario of the transition destination is a loop scenario that returns to a transition point of a scenario of a transition source, the reproduction control unit is configured to retain information regarding the transition point and the control information of the scenario of the transition source and reproduce the scenario of the transition destination.

10. The content reproduction apparatus according to claim 9, wherein, when the loop scenario further transitions to still another scenario and the still another scenario is not a loop scenario, the reproduction control unit is configured to cancel the retention of the information regarding the transition point and the control information of the scenario of the transition source.

11. A content reproduction system comprising:
a content reproduction apparatus configured to reproduce content data;
a content providing server configured to provide the content data; and
a control information providing server configured to provide control information regarding the reproduction of the content data, the control information being associated with the content data,
wherein the content reproduction apparatus includes
a memory device having stored thereon a program; and
a processing device which upon executing the program obtained from the memory device operates as
a reproduction control unit configured to control reproduction of a link-type content including a plurality of scenarios that each include content data and control information regarding reproduction of the content data,
a control information acquisition unit configured to (i) add both common user authentication information commonly used in the scenarios of the content and user authentication information of a respective provider that provides the respective scenario which is unique to each said provider, to an acquisition request message used to acquire the control information, (ii) transmit the acquisition request message, and (iii) acquire the control information associated with the content data to be reproduced from the control information providing server, and
a reproduction control unit configured to control the reproduction of the content data in accordance with the control information, and
wherein the reproduction control unit is configured to control the reproduction of the link-type content by controlling transition between the scenarios by reproducing the content data in accordance with the control information,
wherein the control information acquisition unit is configured to take over the common user authentication information of a user between ones of the scenarios involving different providers without a new log-in operation being performed therebetween, such that when transitioning from a first scenario involving a first provider to a second scenario involving a second provider different from the first provider the control information acquisition unit is configured to take over the common user authentication information of the user so as to enable identification of the user without performing the log-in operation, and
wherein the common user authentication information comprises a common token that is included in the control information provided by one of the providers, wherein the user authentication information of the respective provider comprises a provider token that is included in the control information provided by one of the providers, and wherein the provider token is not taken over when transitioning from a first scenario involving a first provider with a first domain to a second scenario involving a second provider with a second domain different from the first domain.

* * * * *